Aug. 18, 1936.  W. D. FOSTER ET AL  2,051,788
FILM HANDLING APPARATUS
Original Filed April 4, 1929  15 Sheets-Sheet 1
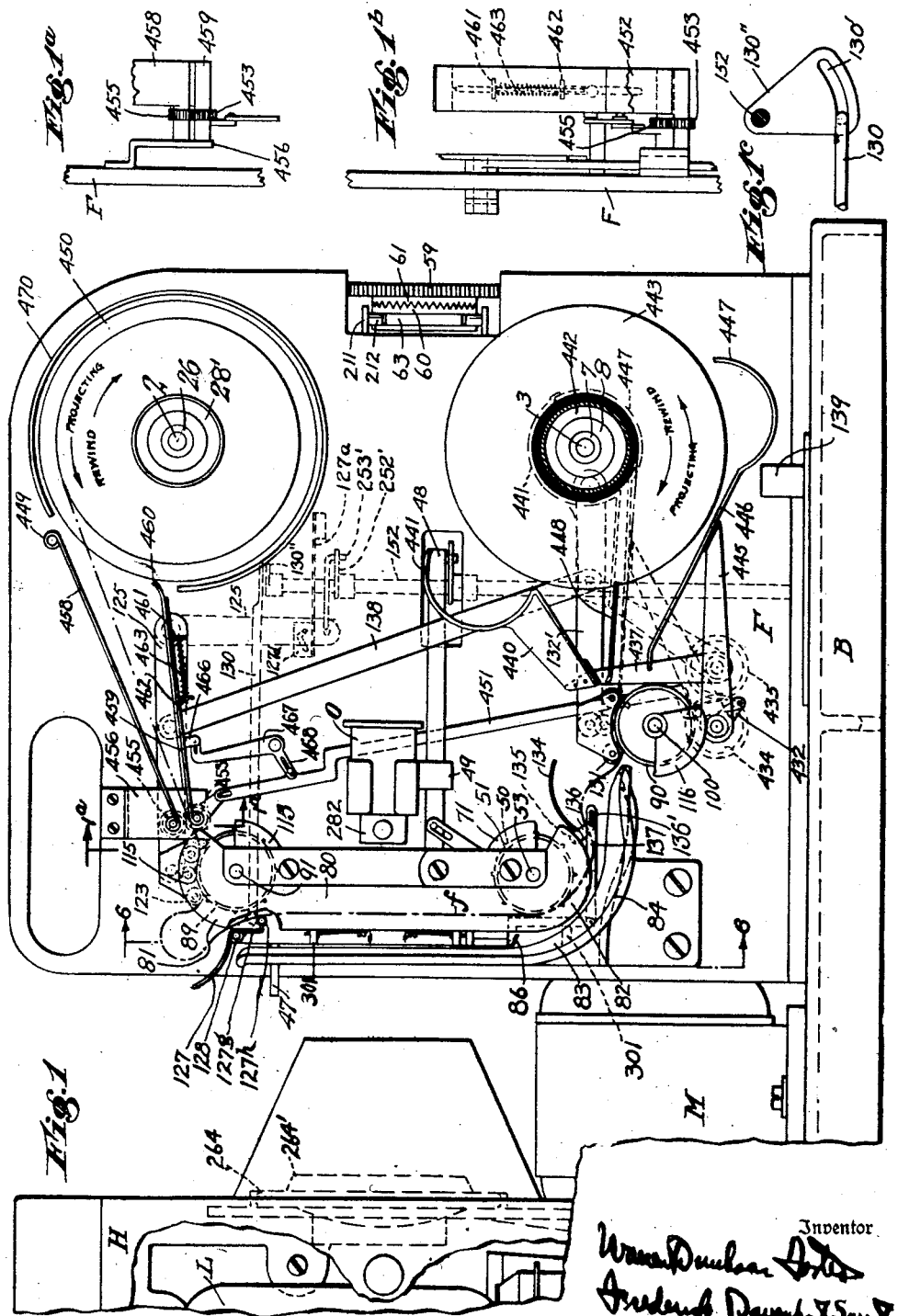

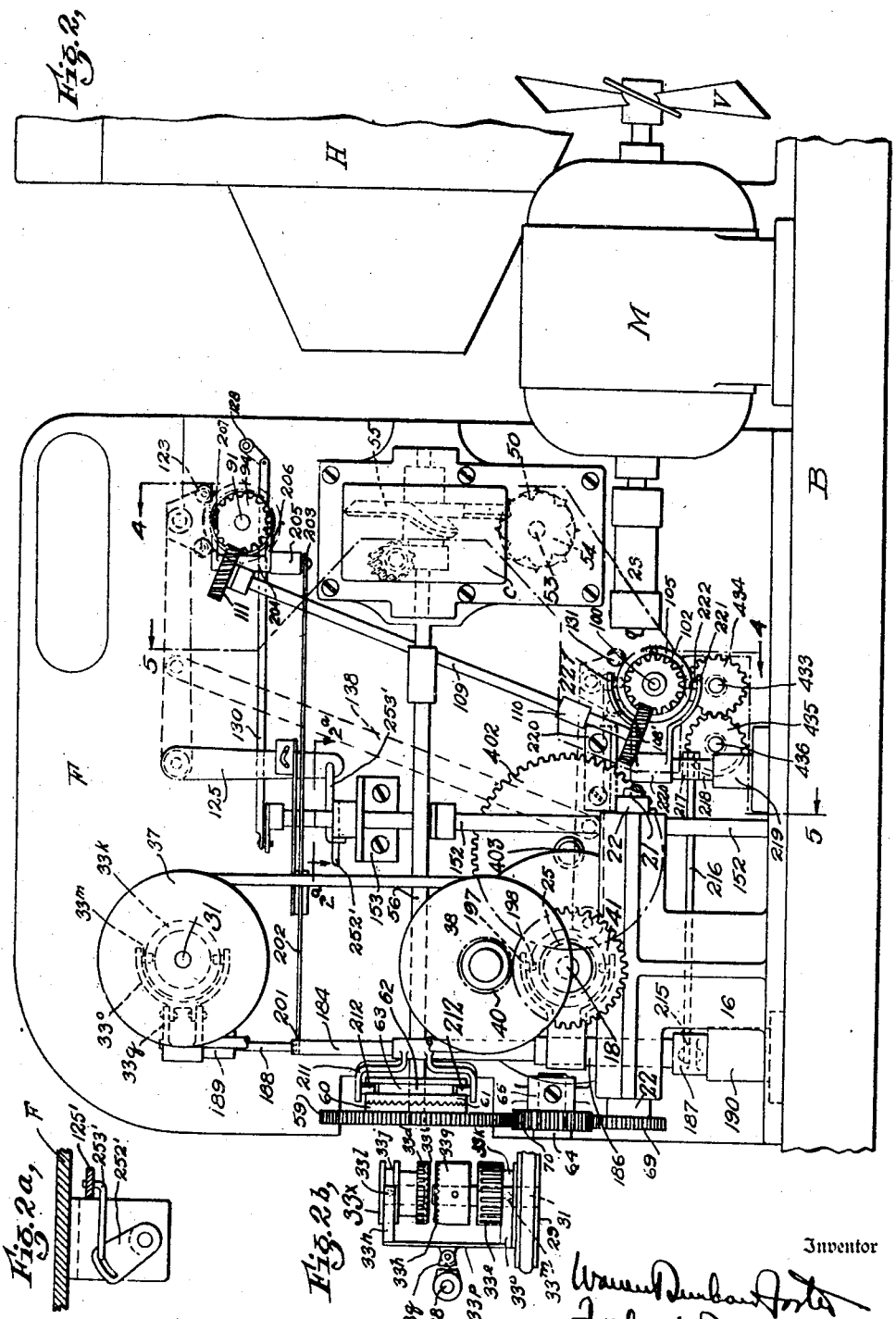

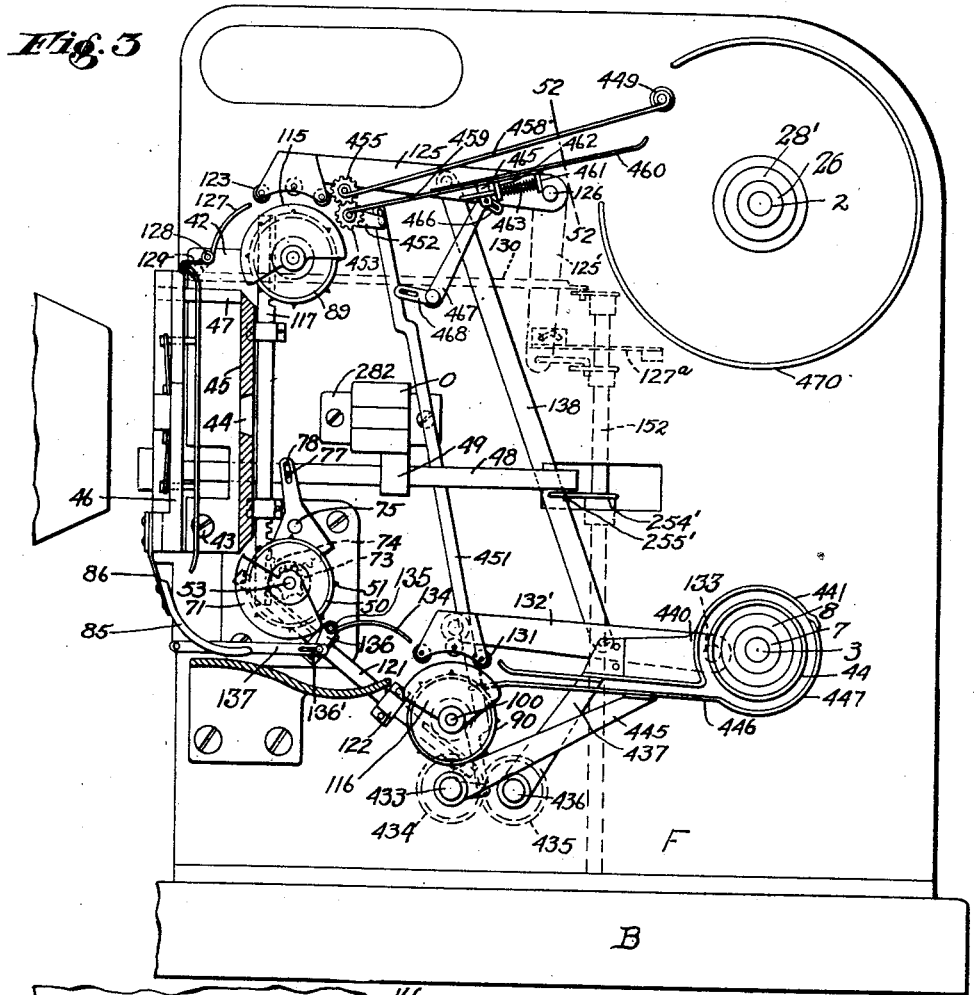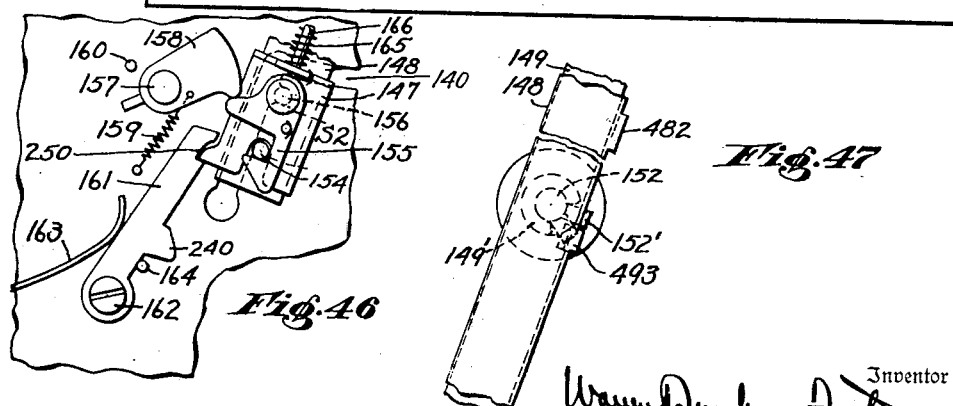

Aug. 18, 1936.  W. D. FOSTER ET AL  2,051,788
FILM HANDLING APPARATUS
Original Filed April 4, 1929   15 Sheets-Sheet 4
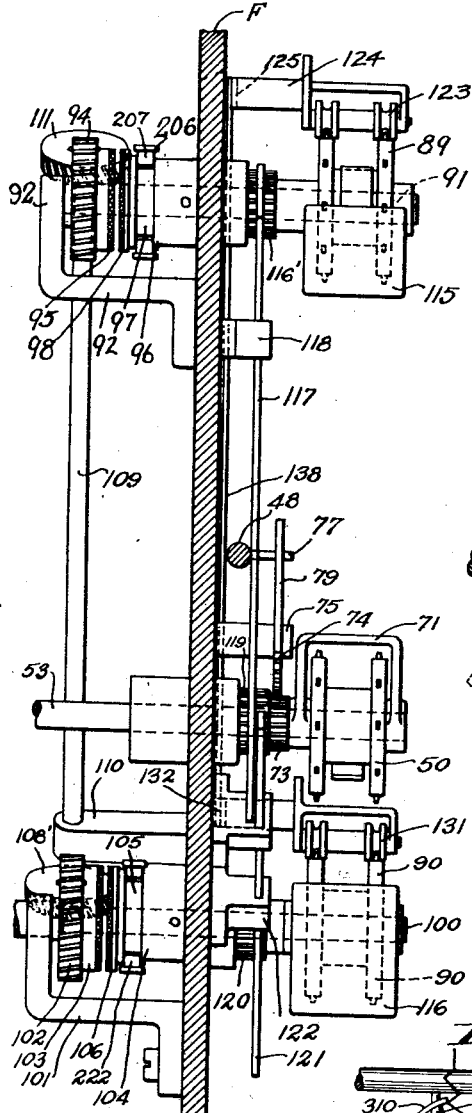
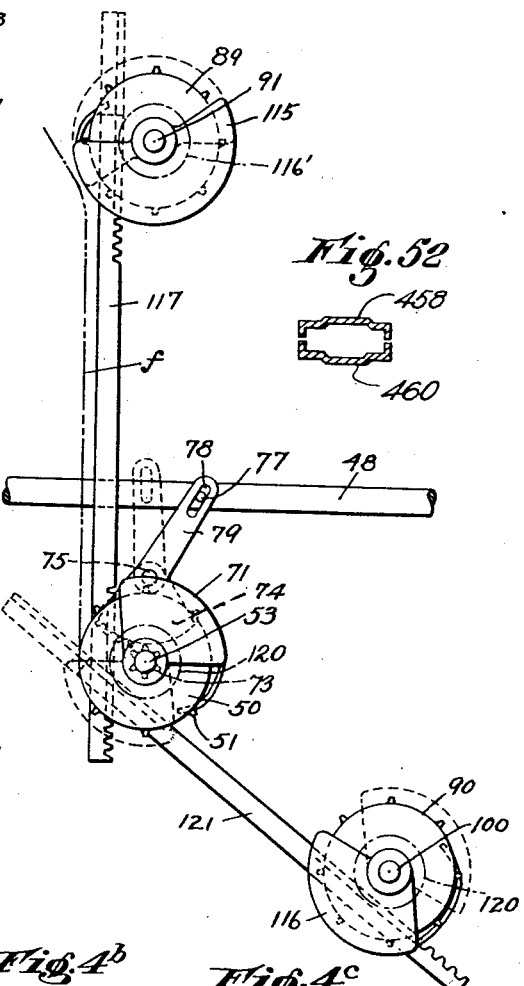
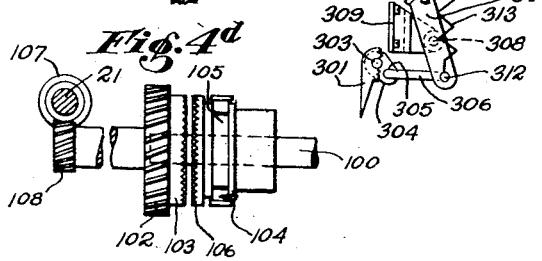

Aug. 18, 1936.   W. D. FOSTER ET AL   2,051,788
FILM HANDLING APPARATUS
Original Filed April 4, 1929   15 Sheets-Sheet 5
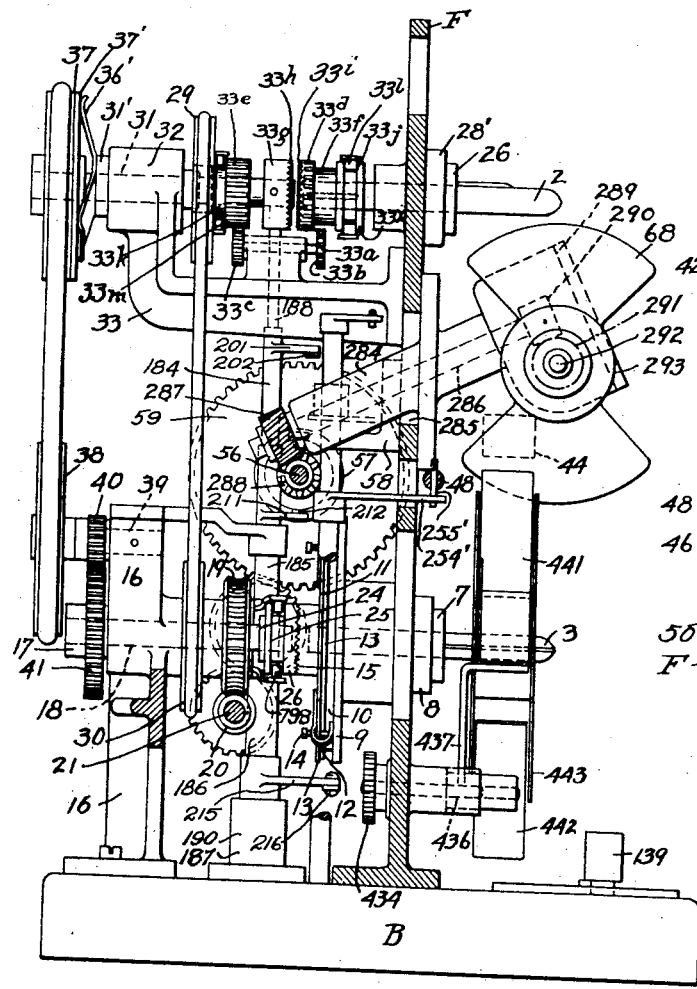
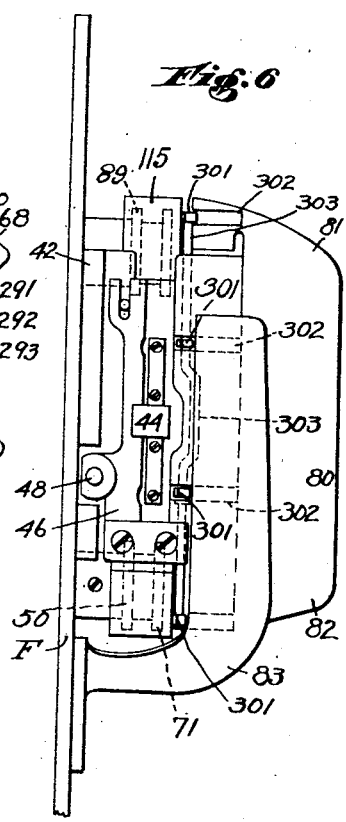
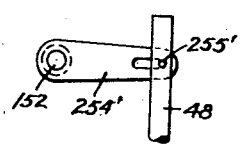
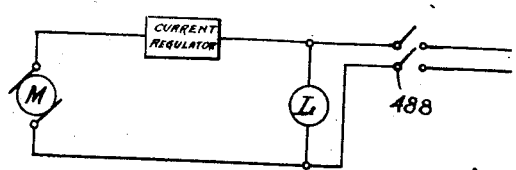

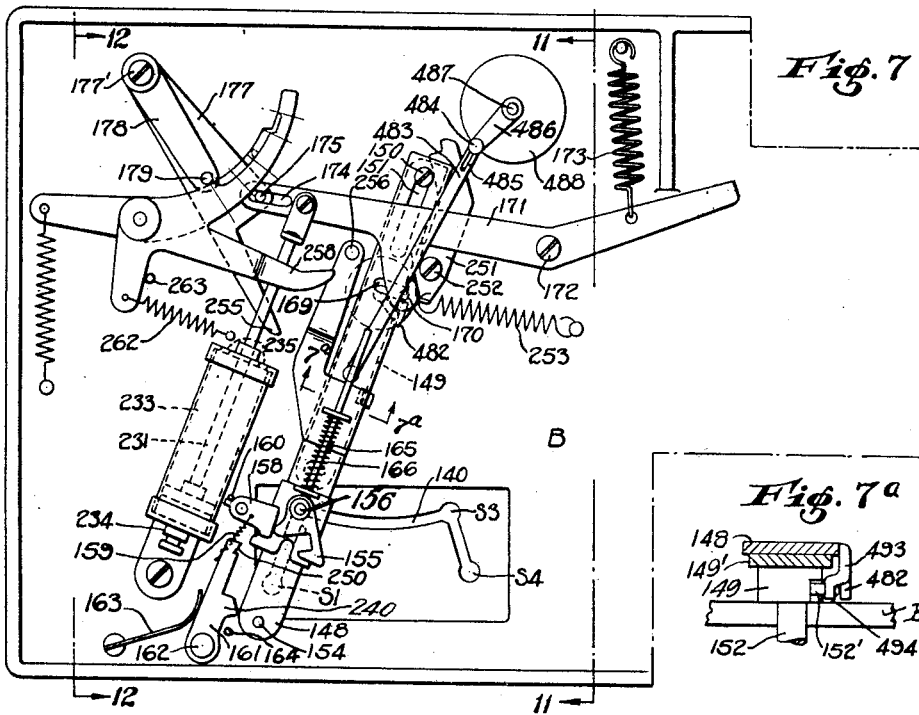

Aug. 18, 1936. W. D. FOSTER ET AL 2,051,788
FILM HANDLING APPARATUS
Original Filed April 4, 1929 15 Sheets-Sheet 8
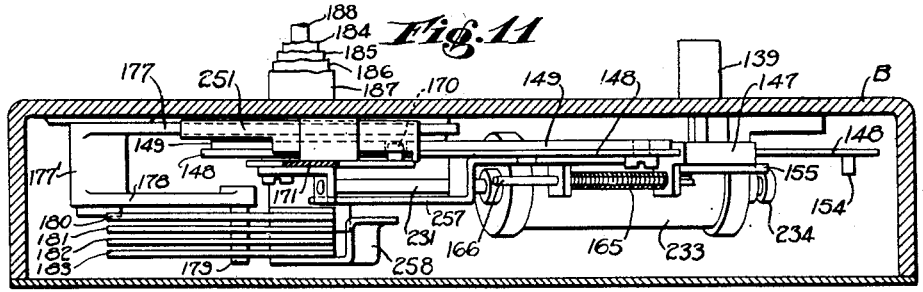
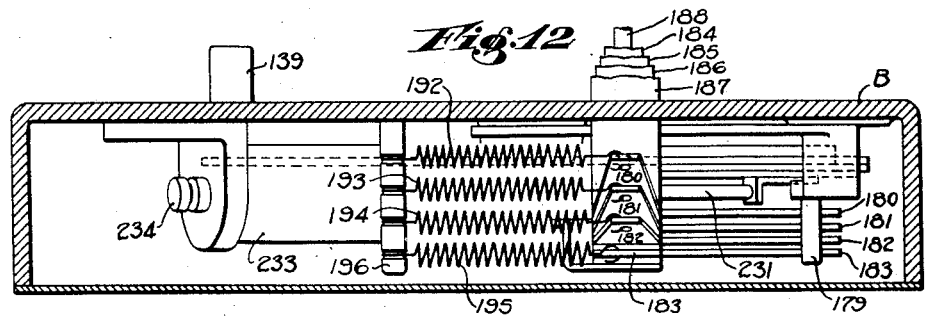
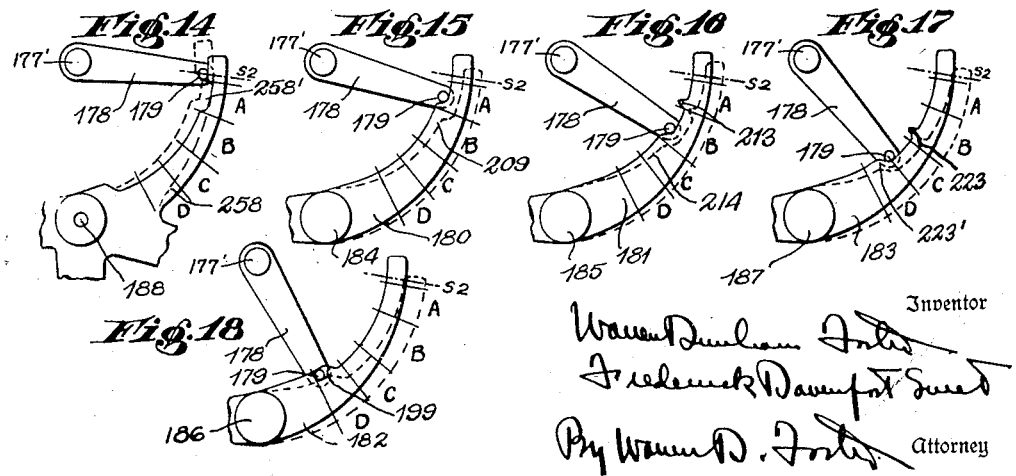

Aug. 18, 1936.    W. D. FOSTER ET AL    2,051,788
FILM HANDLING APPARATUS
Original Filed April 4, 1929    15 Sheets-Sheet 9
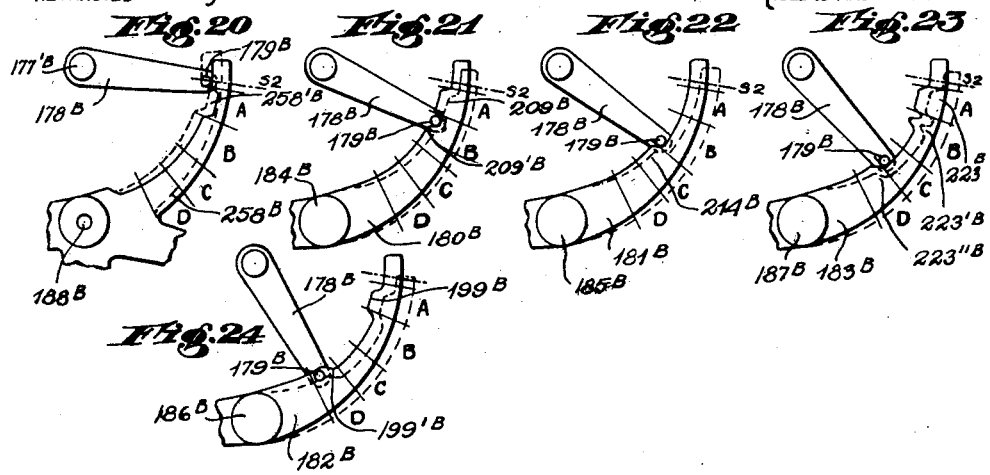
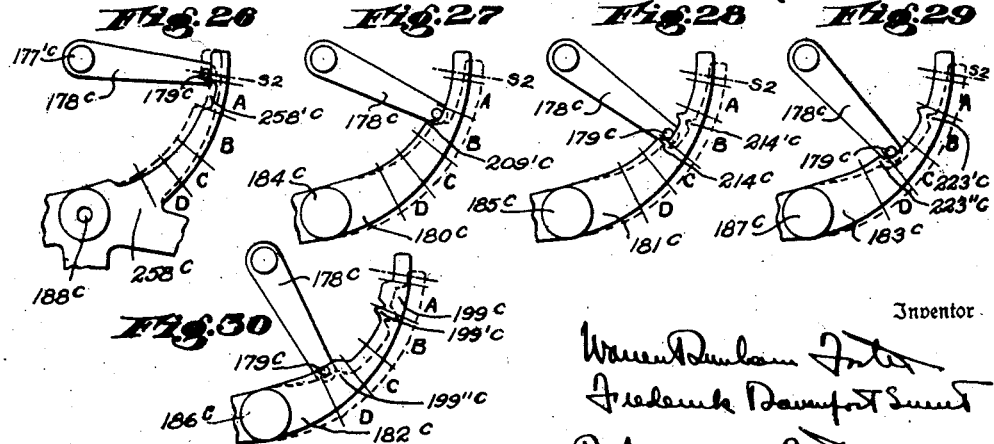

Aug. 18, 1936.    W. D. FOSTER ET AL    2,051,788
FILM HANDLING APPARATUS
Original Filed April 4, 1929    15 Sheets-Sheet 10
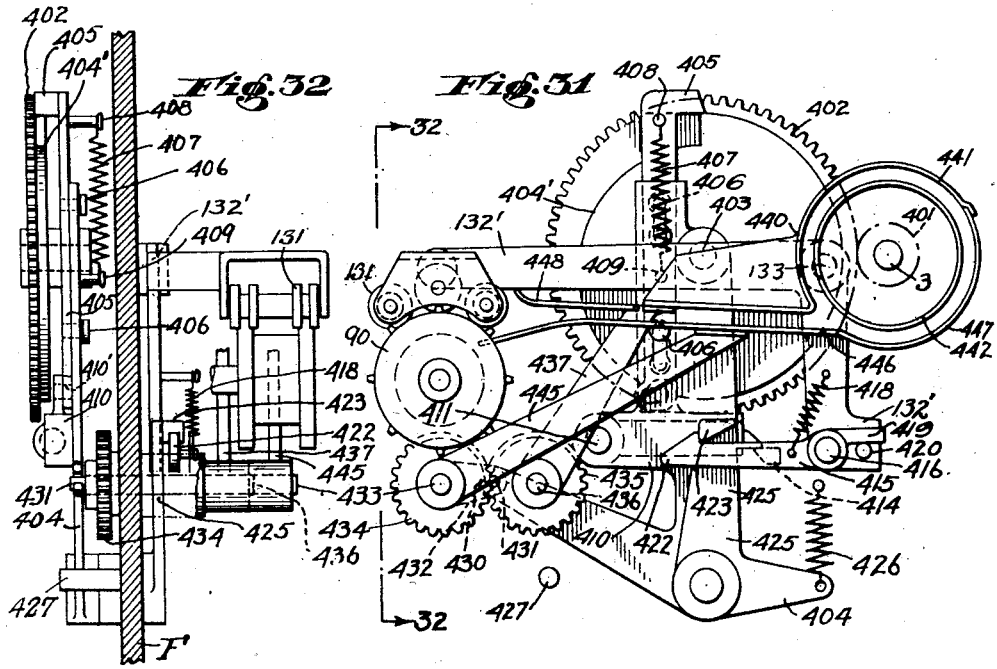
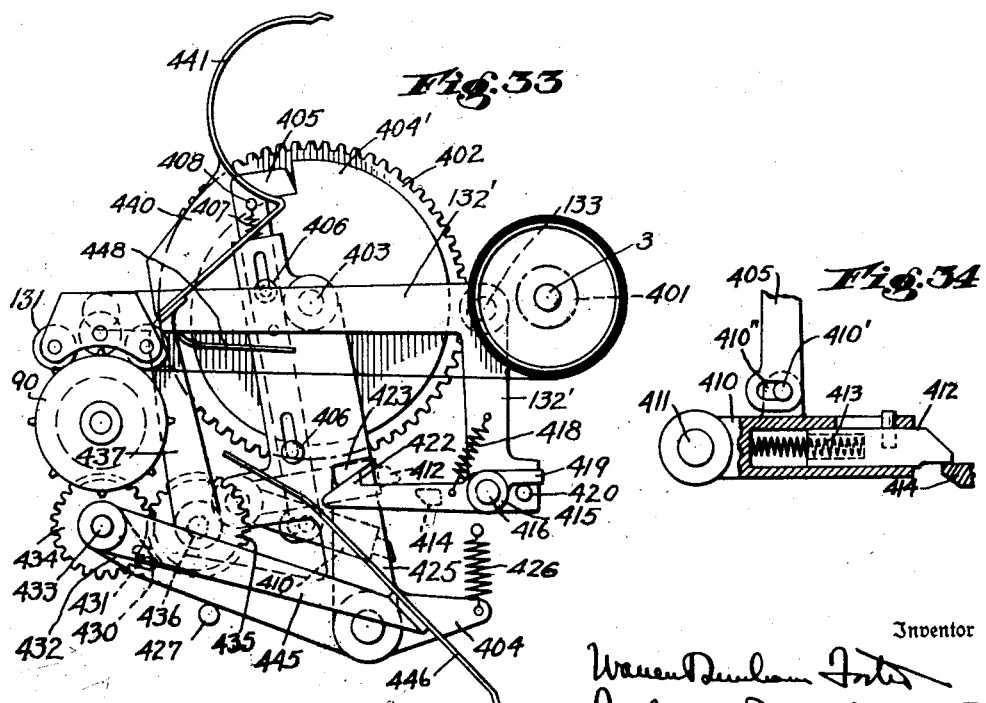

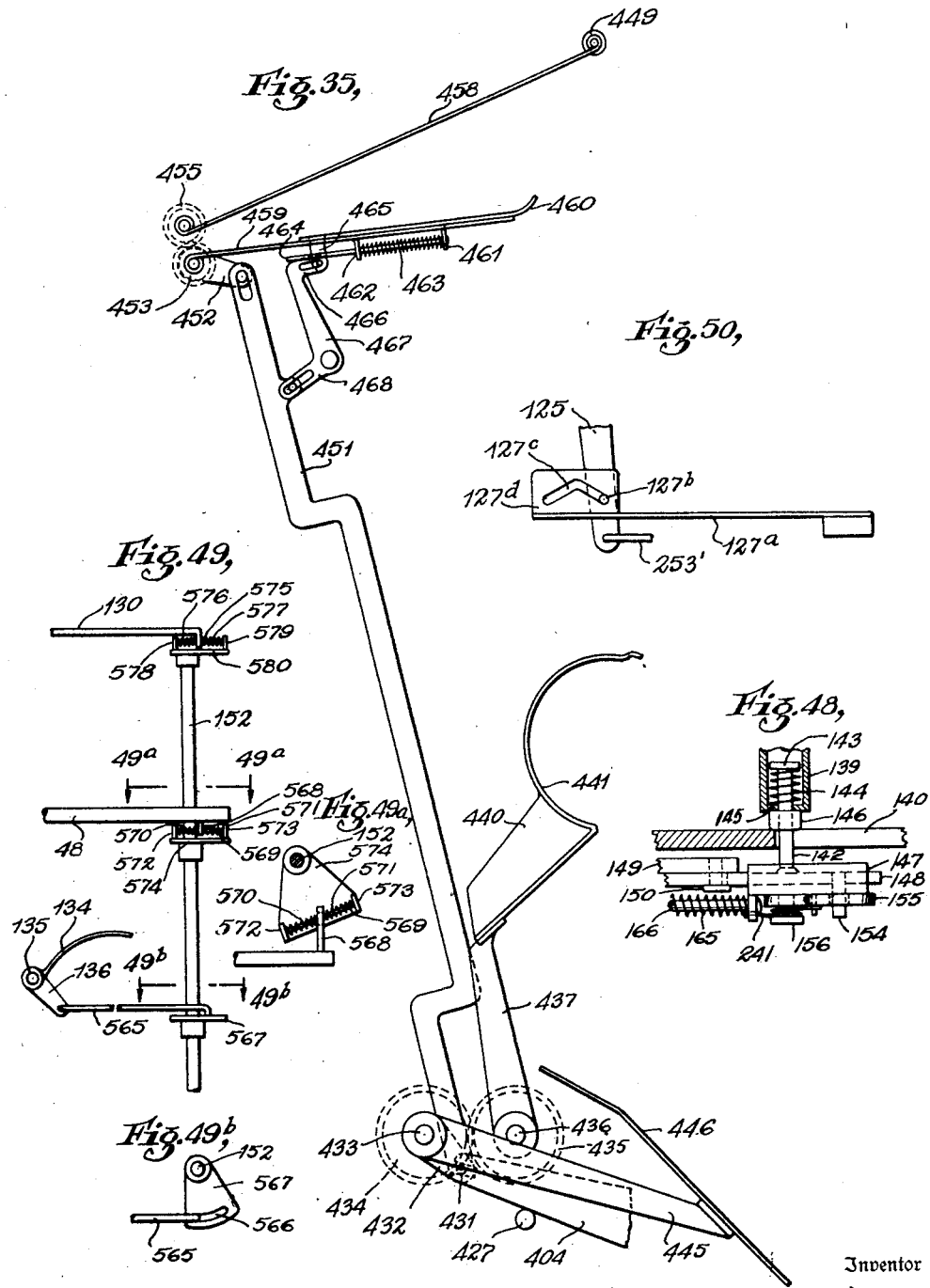

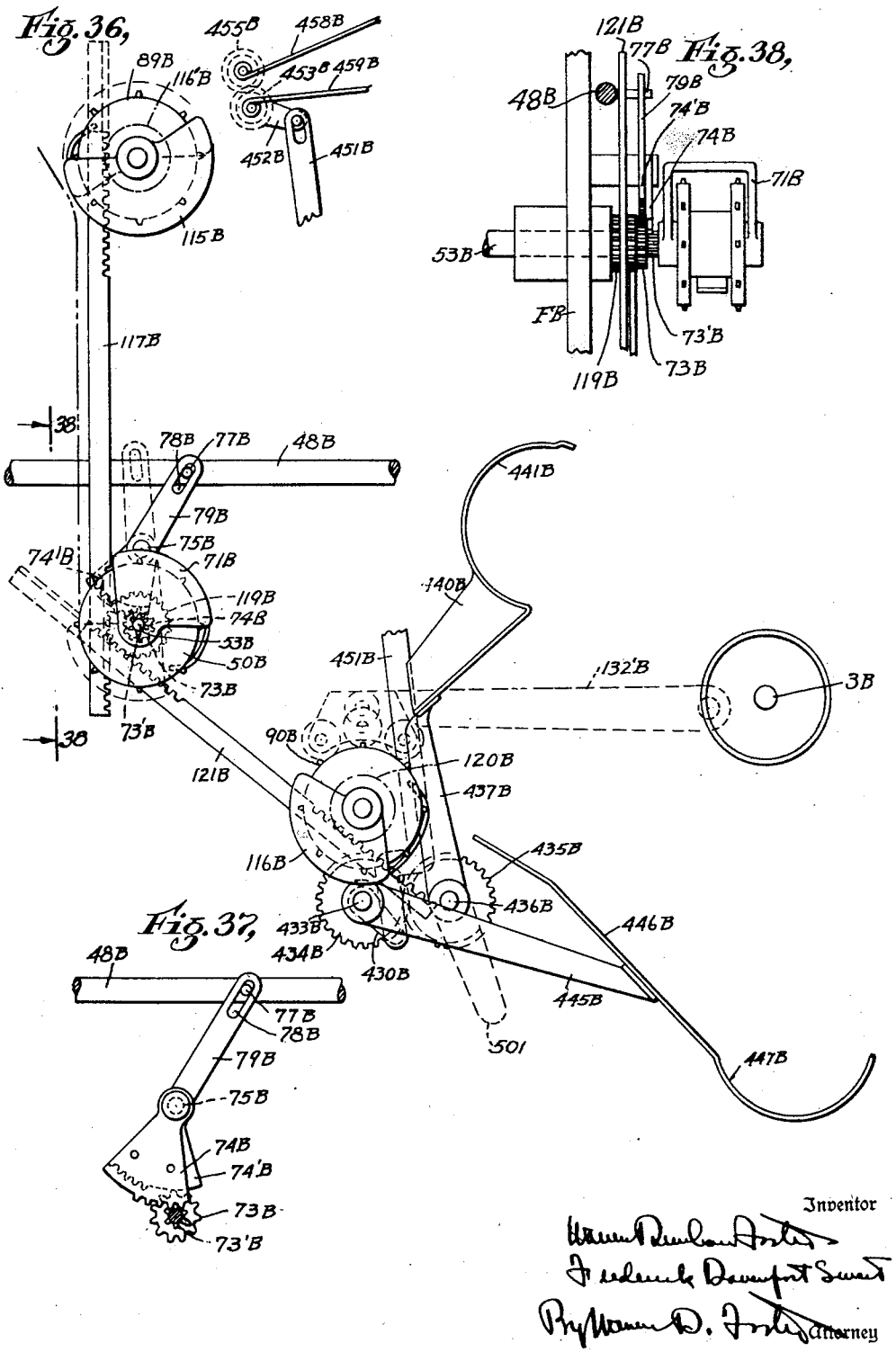

Aug. 18, 1936.  W. D. FOSTER ET AL  2,051,788
FILM HANDLING APPARATUS
Original Filed April 4, 1929  15 Sheets-Sheet 13
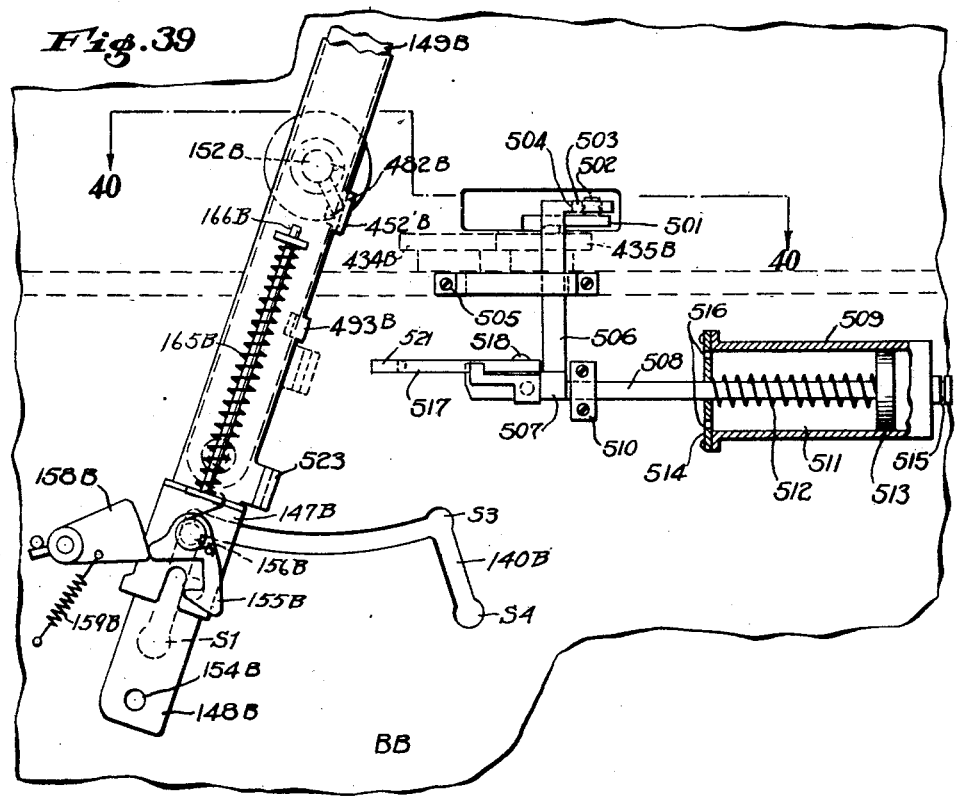
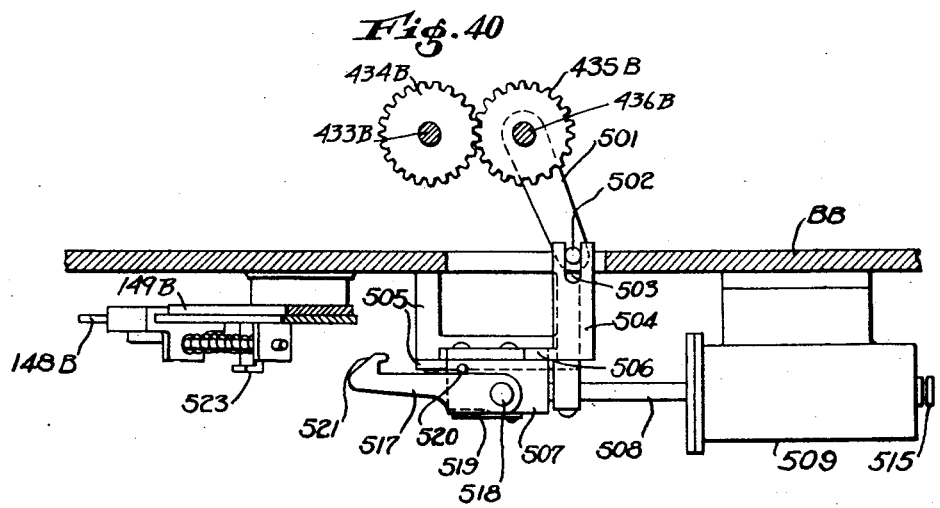

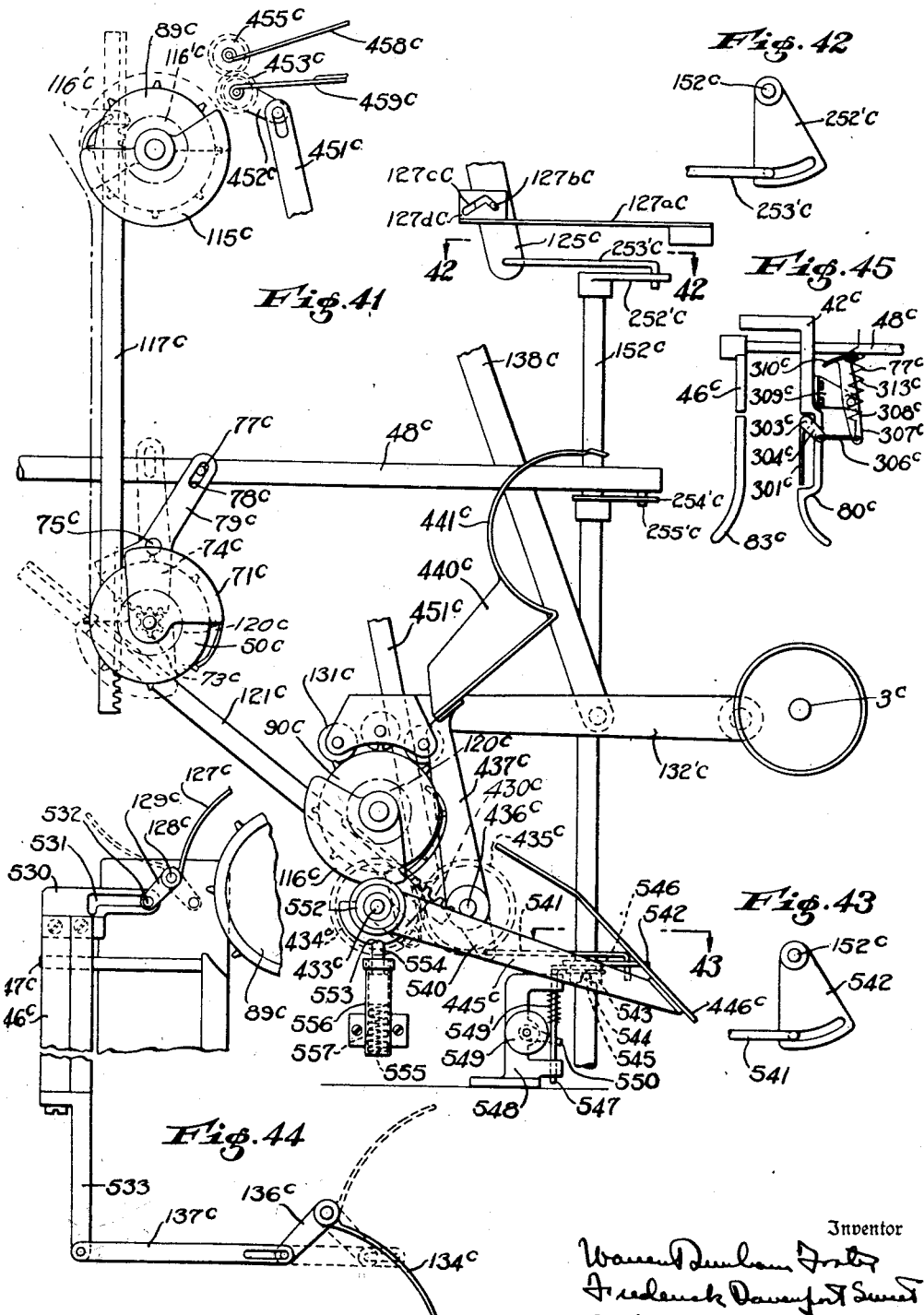

Patented Aug. 18, 1936

2,051,788

UNITED STATES PATENT OFFICE 2,051,788

FILM HANDLING APPARATUS

Warren Dunham Foster, Washington Township, Bergen County, N. J., and Frederick Davenport Sweet, New York, N. Y., assignors, by direct and mesne assignments, to Kinatome Patents Corporation, Ridgewood, N. J., a corporation of New York Original application April 4, 1929, Serial No. 352,525, now Patent No. 1,993,735, dated March 12, 1935. Divided and this application March 11, 1935, Serial No. 10,558

39 Claims. (Cl. 242—55)

The present invention related broadly to the art of photography, and more particularly to improvements in apparatus adapted for the handling of films of whatever character or for whatever purpose. It will be readily understood, however, that the present invention is applicable to many other types of apparatus for handling strip material and to many other uses. Consequently our use of the term "film" is to be taken as representative of any like strip of material which is to be manipulated as by an automatic machine.

An object of the present invention is to provide means whereby a film or other like strip of material may be initially automatically directed and moved through a film handling mechanism from the supply carrier to the take-up carrier in a direction and through a path corresponding to that followed by the film during the normal operation of the apparatus.

An object of the present invention is to provide an entirely automatic film handling apparatus, suitable for use by amateur operators or others who desire to devote a minimum of time, effort, and skill to the operation of the apparatus. To place in complete operation apparatus constructed according to the present invention the user merely places a reel of film in any position upon the supply spindle and moves a single control button. As the result of these two manual operations, the apparatus itself propels the film from the supply reel to the take-up reel and attaches it thereon and, as claimed in our parent patent, during the course of such travel places the film in operative contact with all of the mechanism necessary for the subsequent normal feeding thereof and creates in the film the necessary loops of slack whereby compensation may be secured for the differences in character of movement of the continuously moving feeding members and the intermittently moving feeding member.

Such single movement of the one control button is moreover effective for actuating the motor and light circuit. If he desires, the user may move the one control button to another station whereby he may remove the film from the apparatus and substitute another and to still another station whereby the film is re-wound by the apparatus without removal therefrom, all such operations being performed entirely automatically, the necessary electrical circuits being controlled in an appropriate manner and all operations carried out without further human attention.

A further object of the present invention is to provide entirely mechanical and positive means, operable without putting any especial strain or tension upon the film, whereby all of the above results may be obtained.

This application is a division of our co-pending application Serial Number 352,525, filed April 4, 1929, which upon March 12, 1935, matured as Patent Number 1,993,735. In our parent patent, we claim those aspects of our invention which relate to the apparatus as a whole, particularly including the intermittent feeding member, the automatic formation of the necessary loops of slack film and the operation of the guiding means associated therewith, and the operation of the gate and the guiding and channel forming members associated therewith. The claims of the present application are devoted primarily to those aspects of our invention which relate to the winding and reeling of a film or strip of web material, particularly in connection with the two carrier-supporting spindles, the continuous feeding members associated therewith, and the channel forming and guiding members which cooperate to direct a film or the like between the carriers and between the carriers and the feeding members which draw film therefrom or deliver it thereto. Included among the claims presented herewith are those drawn to the joint control of the means for connecting the film advancing instrumentalities with the power provided therefor and the means for moving the guiding or channel forming members from and to operative position.

Also, the joint control of these guiding and channel forming members and the main driving mechanism is included herein.

Attention is directed to our two co-pending applications Serial Numbers 10,599 and 10,560 filed concurrently herewith, these applications also being divisions of our parent patent. In these other divisional patents, we claim the guiding means associated with the two carrier-supporting spindles and their actuation, both alone and in combination, and in combination with certain other guiding instrumentalities.

A further object of the present invention is the provision of means whereby the film may be propelled from the supply spindle to the continuous sprocket associated therewith and said two elements automatically operated without attention on the part of the operator. Another object is the provision of improved automatic means whereby the film after it has been propelled from said supply spindle through the apparatus to the take-up sprocket may be firmly attached to the carrier positioned upon the take-up spindle.

It has been proposed to provide a guiding member to direct the film from the take-up sprocket to the take-up carrier which guiding member must be initially positioned by an isolated hand operation and is removed from operative position by pressure from the film itself after the mass of film wound upon the hub of the carrier plus the diameter of the hub of the particular carrier which may happen to have been used reaches a certain diameter. The present invention provides guiding members which are automatically brought into and removed from operative position in proper timed relation to the actuation of all of the other related operations of the apparatus, both such movements being definitely timed and being carried out without placing any burden whatever upon the film. Since such guides are moved by power and not by the film, they may be made of such sturdy construction that they are not easily bent or otherwise damaged or rendered inoperative. According to one form of the present invention, a predetermined number of revolutions of the take-up spindle is effective for removing such guiding members from operative position, the actuation of the take-up spindle in turn having been definitely timed in relation to the actuation of all other of the film feeding members and the movement of the gate and other guides. According to another form of the invention, the guide is removed from operative position by the automatically operated mechanism which actuates each of the feeding members and times such actuation and operates the gate and other guides. According to a third form of the invention, the movement of such take-up guide to inoperative position is accomplished by a simple, independent automatic mechanism, itself definitely timed and actuated by the automatic mechanism which controls the actuation of all feeding members and the operation of the gate and other guides. In all forms of the invention, the movement of such take-up guide to operative position is automatically accomplished in proper timed relation to the movement of the other guiding members.

In a preferred modification of the present invention, manually operable control means for such take-up guides are provided as an alternative to automatic operation.

A further object of the present invention is to provide similar guiding means cooperating with the supply spindle whereby the free end of a film positioned thereupon may be directed to the co-operating feeding member. A further object is to control such supply spindle guiding means in the appropriate timed or sequential relation to the operation of the take-up guiding means and to the actuation of both continuous feeding members and the operation of other guides. Such supply spindle guiding means include a fixed section surrounding the carrier upon the supply spindle and cooperating with the operable portion of the guiding means whereby the free end of a film upon such carrier, no matter what the position of such free end, will be directed between the operable guiding members and to the feeding members.

Among the important objects of the present invention is the provision of operative interconnections between the various guiding and channel forming members and the various carrier supporting and feeding members associated therewith. Thus, we automatically start and stop all carriers and all feeding members in the particular timed relation which is appropriate to the movement of the various guiding and channel forming members which direct a film from or to them or any of them.

A further object is to provide means whereby a supply spindle may be operated in one direction to propel a film therefrom and in the other direction to rewind the film thereupon.

A further object includes the provision of means whereby the film may be directed from and to the feeding members in connection with the initial positioning of the film and means whereby such directing means are automatically withdrawn to permit the production of loops of slack in the film.

A further object is the provision of improved propelling, guiding and shielding means for a film, and the provision of control mechanism for each and all of such means and the parts component thereof and associated therewith assuring the actuation and operation of each and all of the same in sequential or other timed relation to the actuation and operation of each other and of the other elements of the film handling mechanism.

An object of the present invention is to provide means for actuating each of the above mentioned elements and all of the elements of the apparatus in that sequential or other timed or otherwise related manner which will result in the completely automatic actuation and operation of the apparatus.

We prefer to illustrate our invention as applied to a film handling apparatus of the type disclosed and claimed in the applications of Barton Allen Proctor, Serial Number 54,910 filed upon September 8, 1925, and upon January 24, 1933, maturing as Patent Number 1,894,963 and Serial Number 348,633, filed March 20, 1929, and upon January 16, 1935, maturing as Patent Number 1,944,037, both of said applications having been co-pending with our parent application, although it will be readily understood that our invention may be applied to other types of apparatus and subjected to control other than that of the sequential and unitary type disclosed in said patents and herein.

It will be understood that our invention as claimed herein may be applied to apparatus in which a film or other web is moved continuously, as in connection with the optical rectification of a motion picture image, a film playing phonograph, or sound recordation or reproduction.

Other objects, advantages and characteristics of the present invention are apparent in the following description, the attached drawings, and the subjoined claims. Although we are showing one preferred embodiment of our invention, it will be readily understood that we are not limited to this particular construction as changes can readily be made without departing from the spirit of our invention or the scope of our broader claims.

In the drawings:

Figure 1 is a right side elevation of the machine, certain parts of the lamp housing being broken away and certain parts being omitted for clarity;

Figure 1a is a view taken on the line 1a—1a of Figure 1; and Figure 1b is a plan view of the same;

Figure 1c is an enlarged detail view of the actuating arm for the upper loop guide;

Figure 2 is a left side elevation of the machine, certain parts being omitted for clarity;

Figure 2a is a detail view of the control link for the film idlers and their associated parts taken on the line 2a—2a of Figure 2;

Figure 2b is a detail plan view of the double clutch for the supply spindle;

Figure 3 is a partial side elevation broken away to show actuating parts in film threading position, certain parts being omitted for clarity;

Figure 4 is an enlarged skeleton view, taken on the line 4—4 of Figure 2, looking in the direction of the arrows, showing the clutches for the feeding sprockets, and the stripping shields cooperating with all feeding members and the means for operating the same;

Figure 4a is a side enlarged skeleton view of such shields and the means for operating the same;

Figure 4b is a view of a portion of the mechanism for actuating the film positioning and locking fingers, such fingers being in the inoperative position and Figure 4c is a side view of the same;

Figure 4d is an enlarged detail view of a portion of the power connection;

Figure 5 is a cross section on a line 5—5 of Figure 2 looking in the direction of the arrows, certain parts being omitted for clarity;

Figure 6 is a partial view, taken on the line 6—6 of Figure 1, showing the right side only to illustrate the gate; Figure 6a is a detail view of the gate rod crank lever and associated parts;

Figure 7 is a partial bottom plan view showing actuating levers in "projection-in-motion" position, with the control mechanism at station S1 and with the manual control button at station 0, out of operative contact with the mechanism and about to be moved into such operative contact;

Figure 7a is an enlarged detail view taken on the line 7a—7a of Figure 7 looking in the direction of the arrows;

Figure 8 is a partial bottom plan view showing actuating levers in the "intermediate" position S0, having been manually brought to such position from station S1;

Figure 11 is an enlarged view, taken upon the line 11—11 of Figure 7, looking in the direction of the arrows, certain parts being omitter for clarity;

Figure 12 is an enlarged view, taken upon the line 12—12 of Figure 7, looking in the direction of the arrows, certain parts being omitted for clarity;

Figure 13 is a diagram illustrating the timed or sequential operation of certain elements of the apparatus when constructed in accordance with the form thereof known for convenience as form "A";

Figure 14 is an enlarged detail view of a portion of the supply spindle clutch control mechanism, constructed according to form "A";

Figure 15 is an enlarged detail view of a portion of the supply sprocket clutch control mechanism, constructed according to form "A";

Figure 16 is an enlarged detail view of a portion of the intermittent or feeding sprocket control mechanism, constructed according to form "A";

Figure 17 is an enlarged detail view of a portion of the take-up sprocket control mechanism, constructed according to form "A";

Figure 18 is an enlarged detail view of a portion of the take-up spindle control mechanism, constructed according to form "A";

Figure 19 is a diagram illustrating the timed or sequential operation of certain elements of the apparatus when constructed in accordance with a preferred modification, such modification being known for convenience as form "B";

Figure 20 is an enlarged detail view of a portion of the supply spindle clutch control mechanism, constructed according to form "B";

Figure 21 is an enlarged detail view of a portion of the supply sprocket control mechanism, constructed according to form "B";

Figure 22 is an enlarged detail view of a portion of the intermittent or feeding sprocket control mechanism, constructed according to form "B";

Figure 23 is an enlarged detail view of a portion of the take-up sprocket control mechanism, constructed according to form "B";

Figure 24 is an enlarged detail view of a portion of the take-up spindle control mechanism, constructed according to form "B";

Figure 25 is a diagram illustrating the timed or sequential operation of certain elements of the apparatus when constructed in accordance with a preferred modification, such modification being known for convenience as form "C";

Figure 26 is an enlarged detail view of a portion of the supply spindle clutch control mechanism, constructed according to form "C";

Figure 27 is an enlarged detail view of a portion of the supply sprocket control mechanism, constructed according to form "C";

Figure 28 is an enlarged detail view of a portion of the intermittent or feeding sprocket control mechanism, constructed according to form "C";

Figure 29 is an enlarged detail view of a portion of the take-up sprocket control mechanism, constructed according to form "C";

Figure 30 is an enlarged detail view of a portion of the take-up spindle control mechanism, constructed according to form "C";

Figure 31 is an enlarged detail view of the take-up guiding mechanism in operative position, the frame being omitted for the sake of clarity;

Figure 32 is a view taken on the line 32—32 of Figure 31 looking in the direction of the arrows and showing a portion of the frame of the apparatus;

Figure 33 is a view corresponding to Figure 31, the parts being in inoperative position;

Figure 34 is an enlarged detail view of a portion of the operating trigger and primary latch controlled thereby;

Figure 35 is a skeleton view of the guiding mechanism associated with the take-up spindle, the guiding mechanism associated with the supply spindle, and the operative connection therebetween;

Figure 36 is an enlarged skeleton view, corresponding in part to Figure 33, of guiding mechanism associated with the spindles, in the inoperative position, such mechanism being operated in accordance with form "B" of the invention, and of the control mechanism for the shielding members associated with the feeding members whereby such shielding members are sequentially operated;

Figure 37 is an enlarged detail view of a portion of such actuating mechanism;

Figure 38 is a partial view looking in the direction of the arrows taken on line 38—38 of Figure 36;

Figure 39 is an enlarged detail view of the operating mechanism for the guiding mechanism associated with the spindles constructed according to form "B" of the invention and also of the means for actuating such mechanism;

Figure 40 is a view taken on the line 40—40 of Figure 39 looking in the direction of the arrows;

Figure 41 is an enlarged skeleton view, corresponding in part to Figures 33 and 36, of the guiding mechanism associated with the spindles, constructed according to form "C" of the invention, such guiding mechanism being either manually or automatically operable and being operated in direct connection with the gate closing mechanism, and of the control mechanism for the shielding members whereby such members are operated during the last portion of the gate closing movement;

Figure 42 is a view taken on the line 42—42 of Figure 41, looking in the direction of the arrows;

Figure 43 is a view taken on the line 43—43 of Figure 41, looking in the direction of the arrows;

Figure 44 is an enlarged detail sectional view of means whereby the upper and lower loop guides are actuated directly by the movable section of the gate;

Figure 45 shows an improved form of lateral positioning and locking mechanism and gate structure;

Figure 46 (sheet 3) is an enlarged detail view of the control mechanism at station S2 whereby a still picture may be projected;

Figure 47 (sheet 3) is an enlarged detail view of a portion of the control mechanism showing means for securing a dwell between the initial and final gate closing movements;

Figure 48 (sheet 11) is a side view broken away in part of the structure shown in Figure 46;

Figure 49 (sheet 11) is a view of a preferred modification of the mechanism for actuating the upper and lower loop guides in sequential relation;

Figure 49a is a view taken on the line 49a—49a of Figure 49, looking in the direction of the arrows;

Figure 49b is a view taken on the line 49b—49b of Figure 49 looking in the direction of the arrows;

Figure 50 (sheet 11) is an enlarged detail view of a portion of the mechanism for actuating the film retaining members, when constructed according to a preferred modification;

Figure 51 (sheet 5) is a wiring diagram of the apparatus.

Figure 53:
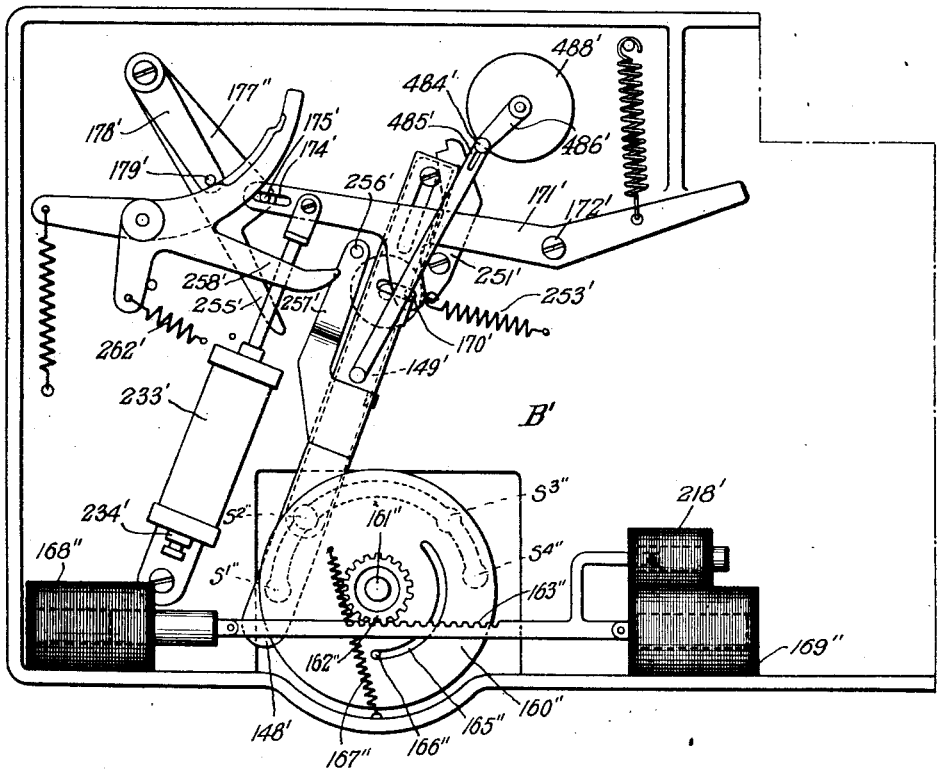

Figure 52 is a cross section along the line 52—52 of Figure 3;

Figure 53 shows control mechanism of our invention operated in accordance with the copending aplication of Warren Dunham Foster, now Patent Number 1,943,303.

In carrying out the present invention, there may be provided an apparatus comprising a supporting base B having mounted thereon a lamp L and resistance containing housing H and a supporting frame F upon which are mounted the operating parts of the film feeding and controlling mechanism per se.

Preferably carried by the frame F and projecting from one side thereof in predetermined spaced relationship is a pair of reel receiving spindles 2 and 3, the spindle 2 being adapted for the holding of a reel of film during the feeding movement thereof and adapted to effect rewinding of the film at the conclusion of the feeding movement, while the spindle 3 is adapted to be positively driven during the feeding movement for coiling the film as required.

The spindle 3, which will hereafter be referred to as the driving or take-up spindle, is journaled for rotation in a suitable bearing 7 in an enlarged boss 8 in the frame F. A friction driving member 9 is secured to the left hand end of the spindle as viewed in Figure 5. The driving member 9 has a friction surface 10 with which is adapted to cooperate a second friction member 11 in the form of a disk. The disk 11 and the driving member 9 are preferably held in frictional engagement by means of springs 12 carried by the member 9 and bearing against the disk 11 through the medium of an annulus 13, the springs being held under the desired tension and the annulus being maintained in position by adjusting screws 14. Projecting rearwardly from the disk 11 is a circular series of closely spaced teeth 15 adapted to be engaged by a clutch hereinafter described in detail by means of which the driving spindle 3 may be rotated through the friction surfaces just described.

Projecting from the base B in spaced relation to the frame F is a bearing bracket 16 carrying a bearing 17 for a shaft 18 extending in alignment with the driving spindle 3. Secured in any desired manner to the shaft 18 for rotation therewith is a worm wheel 19 adapted to be driven by a worm 20 secured to a horizontally positioned driving shaft 21 located on one side of the frame F. This shaft at its forward end is mounted in spaced bearings 22 carried by the bracket 16 and is connected to a driving motor M preferably through a flexible coupling 23 of any desired or usual construction. By reason of this mechanism, it will be apparent that when the motor M is operated, the shaft 18 will be positively driven through the worm and wheel before referred to. For transmitting this rotational movement from the shaft 18 to the spindle 3 at will there is provided a collar 24 mounted upon the right hand end of the shaft 18 as viewed in Figure 5 for rotational movement therewith and longitudinal movement relatively thereto and including an extension, having therein a groove 25, and terminating in closely spaced teeth 26. By moving such collar 24 to the right, as viewed in Figure 5, the teeth are projected to bring them into engagement with the corresponding teeth 15 whereby a positive drive is immediately established for the driving spindle. This clutch will hereinafter be referred to as the driving spindle or take-up spindle clutch.

The spindle 2, which will hereinafter be designated the rewinding spindle, or, when the context makes such phrasing desirable, as the delivery or supply spindle, is mounted similarly to the driving spindle 3 in a bearing 26 carried by the frame F, an enlarged boss 28' being provided coaxial with such bearing and spindle. Extending in alignment with the rewinding spindle 2 is a shaft 31 suitably journaled in a bearing 32 carried by a bracket 33 illustrated as secured to the frame F, all as is clearly shown in Figure 5. For driving the shaft 31 there may be provided a collar 31' pinned to the shaft 31 and bearing against a flat spring 36' which forces a fibre disk 37' against a face of a pulley 37.

The pulley 37 is mounted in line with a similar pulley 38 mounted on the outer end of a stub shaft 39 secured in the bracket 16. Also mounted on the shaft 39 is a spur gear 40 adapted to be driven by a similar, but preferably larger, gear 41 on the outer end of the shaft 18. By passing a suitable belt around the pulleys 37 and 38 it will be apparent that the shafts 18 and 31 may be simultaneously rotated by the motor M, the shaft 31 preferably rotating at a higher speed than the shaft 18.

It will readily be understood by those skilled in the art that this provision of a yielding drive for the shaft 31 especially in combination with the belt and pulley drive, prevents the forward or "leader" end of the film which is attached to the take-up spindle 3 being torn loose therefrom at the conclusion of the rewinding cycle.

Loosely mounted upon the shaft 31 is the pulley 29 which is connected by a suitable belt with the pulley 30 pinned to the shaft 18. By reason of such construction, during the operation of the motor, the pulley 29 is constantly in motion in the same direction as the shaft 18, namely in a feeding direction, and the shaft 31 is constantly in motion in a contrary or rewinding direction.

For operatively connecting at will either the shaft 31 or the pulley 29 to the spindle 2, the following mechanism may be employed:

Mounted in an upward extension of the bracket 33 is a shaft 33a to the ends of which are pinned spur gears 33b and 33c meshing respectively with spur gears 33d and 33e. Such gear 33d is attached to the left hand end of a collar 33f which is mounted upon the left hand extension of the spindle 2, as viewed in Figure 5, for rotation therewith and longitudinal movement relatively thereto. Such gear 33e is attached to the right hand side of the pulley 29 for revolution therewith. Pinned to the shaft 31, is a collar 33g in the right hand side of which are cut closely spaced teeth 33h for cooperation with closely spaced teeth 33i formed in the left hand side of the gear 33d, as viewed in Figure 5. Cooperating with a groove 33j in a collar 33x formed with and attached to the gear and with a depression 33k between the gear 33e and the pulley 29, are fingers 33l and 33m, which, as clearly seen in Figure 2b, are carried by forked arms 33n and 33o yoked together by a bar 33p loosely attached to an arm 33q which in turn is attached to the supply spindle control rod 188 later described.

By reason of this construction, it will be evident that movement to the right of the yoke 33p and the fingers 33m and 33l from the neutral position shown in Figure 5, will communicate the rotation of the pulley 29 to the spindle 2 by by bringing the gears 33b and 33d into operative engagement and will serve to rotate such spindle in the same direction as such pulley and the take-up spindle 3 are rotated, namely, in a feeding direction. Movement of the yoke 33p to the extreme left as viewed in Figure 5 will be effective for destroying the connection between the gears 33b and 33d and for bringing the teeth 33i into contact with the teeth 33h, thereby placing the spindle 2 in direct operative connection with the shaft 31 and rotating it thereby in a contrary direction from that in which it was previously rotated, namely, in a rewinding direction.

In view of the fact that a gate, stripping and shielding members, and the guiding surfaces associated therewith form a part of the channel in which the film is initially threaded and through which it is later fed in a projecting operation, it will be necessary to describe them herein.

We prefer so to construct a gate that the film may be initially positioned in respect thereto either by the operation of a feeding member which propels the free end of the film between the sections of the gate or by a single lateral manual movement of the film relative to the gate. We prefer also to make use of the construction shown by the said Proctor in his above mentioned patents by reason of which it is possible at any time to stop the operation of the apparatus, open the gate and move the guiding elements associated therewith to inoperative position and manually remove the film from the gate by a movement at right angles to its path of travel therethrough.

Mounted on the frame F adjacent the motor M, we may place a gate section 42 preferably secured in any desired manner as by screws 43 against movement relatively to the frame. This section is preferably formed with an aperture 44 through which light may be projected as well understood in the art, and with a film guiding depression 45 extending lengthwise of the section and intersecting the aperture 44 for the travel of the film, such depression preferably being of great depth relatively to the thickness of the film. Cooperating with the section 42 is a relatively movable section 46 preferably guided by a pin 47 projecting outwardly from the section 42, and secured to one end of the gate opening rod 48 slidable through a suitable opening in the gate section 42 and a suitable bearing 49 on the frame F. The usual spring pressed pressure plate is provided. By reason of this construction, it will be apparent that when the rod 48 is moved to the left as viewed in Figures 1 or 3 it will be effective for moving the section 46 away from the section 42 thus relieving the pressure between the sections and permitting the removal of one film or the insertion of another film, such insertion being accomplished either by propulsion or by a manual lateral movement, while movement in the opposite direction will bring the sections into cooperative relation. An idler 127h may be mounted at the upper end of the section 42 for cooperation with the film below the upper loop, later described.

Claims which include the intermittent feeding means as such will be found in our co-pending parent patent. In view of the fact that we claim herein the movement of the film through the apparatus in order to carry out the regular feeding operation and the intermittent feeding member is one of the elements which so feeds the film, it will be necessary to describe the construction and control of that member.

For effecting the desired intermittent feeding motion of a film in position in the gate, there may be provided a feeding sprocket 50 having film engaging teeth 51 adapted to engage usual perforations substantially peripherally positioned in the film f. This sprocket is mounted on a shaft 53 extending transversely through the frame F and carrying at its opposite end a star wheel 54, as is clearly shown in Figure 2. This star wheel, which may be of any well known construction, is adapted to be intermittently driven by means of a sectional cam 55 secured adjacent one end of a shutter shaft 56 journalled at one end of a grease casing C within which are mounted the cam 55 and star wheel 54, and at its opposite end may be journalled in a suitable bearing carried by a bracket projecting from the frame F as shown in Patent 1,894,963.

Mounted loosely upon the shaft 56 adjacent the opposite end thereof, (Figure 2) is a gear 59 upon the inner surface of which are mounted closely spaced teeth 60 which engage with teeth 61 which project forwardly from a collar 62 mounted in a long bearing upon the shaft 56 for rotational movement therewith and longitudinal movement relative thereto, such collar including a groove 63.

Intermediate the gate section 42 and an objective lens O a shutter 68 may be positioned and driven as described in our parent patent.

Secured to the end of the driving shaft 21, and in line with the gear 59, is a gear 69 which through a gear 70 mounted upon a shaft 64 supported in a bracket 65 is effective for driving the shutter shaft 56 from the drive shaft 21. By reason of this construction, it will be apparent that when the collar 62 and the teeth 61 are moved to the left as viewed in Figure 2 the shutter shaft 56 is rotated by the motor M.

As is clearly shown in Figures 4 and 4a, cooperating with the sprocket 50 and normally occupying the position illustrated in Figure 1 of the drawings, is a stripping shield 71 mounted loosely upon the sprocket shaft 53. Secured to the inner side of the shield 71 is a pinion 73 with which meshes an arcuate rack 74 having a pivotal mounting 75 and operated simultaneously with the operation of the gate rod 48 by means of a pin 77 projecting outwardly from the gate opening rod and engaging a slot 78 in an extension 79 of the arcuate rack. With the construction just described, movement of the gate opening rod to the left as viewed in Figure 4a for the purpose of opening the relatively separable gate sections, will effect rotation of the rack in a counter-clockwise direction as viewed in this figure, thereby rotating the shield in a clockwise direction. This rotational movement of the shield will be effective for engaging the film f and stripping the same from the sprocket preparatory to the removal of the film from the apparatus or rewinding. During the application by lateral movement of a new film or during rewinding, it will remain in this position, preferably covering all of the teeth of the sprocket which are exposed during the feeding of the film. Thus the threading operation of the film is greatly expedited, and the film completely protected from all teeth during such changing operation or during rewinding.

For further assisting the manual, lateral threading movement, the relatively fixed gate section 42 is provided with a forwardly projecting guide 80 having a generally curved contour for gradually guiding the film over the fixed gate section, the guide having a curved and inclined end 81 for insuring passage of the film over the sprocket and an oppositely inclined and curved end 82 for the purpose hereinafter more fully set forth. The frame F also has secured thereto a secondary guide member 83 positioned in spaced relation to the guiding member 80 and adapted to extend substantially in alignment with the inner face of the movable gate section when it has been moved to open position, whereby the film is effectively guided into position between these gate sections. The member 83 has a curved lower extending end 84 having a function corresponding to that of the curved end 82 of the guide member 80, and described in detail hereinafter. Supported from one end of the movable gate section by the spring 86 is a shoe 85 curved to generally conform to the curvature of the sprocket 50, the contour of the inner surface accommodating the teeth 51 of the sprocket. These guides and shoe cooperate in a manner, as will be readily apparent from the drawings, to permit a film to be positioned between the gate members by moving the same along its normal direction of travel through the gate or, if desired, by moving it laterally relatively to such direction, and to be removed, if desired, prior to the completion of its feeding movement by a similar lateral movement in the opposite direction. The movement of the shoe 85, later described, is effective to place the film in operative position relative to the sprocket 50. This greatly lessens the time required for threading new film into position, and assists in the automatic operation of the apparatus.

In order bodily to position the film in proper lateral relation to the film moving means and to the gate, we provide a positioning mechanism of the type disclosed and claimed in Patent Number 1,944,037 of Barton Allen Proctor, dated January 16, 1934, which is a continuation in part of his Patents Number 1,894,963, dated January 24, 1933 and Number 1,944,033, dated January 16, 1934, all of said patents having been co-pending with our parent patent. An improved form of such mechanism is later described.

As will be apparent from Figures 1, 6, 4b, and 4c, there are provided film positioning fingers 301 of such nature that when retracted they lie entirely within recesses 302 within the area of the fixed gate section. Suitably attached to such fingers, is a connecting rod 303 to which movement is applied through an arm 304, in an opening 305 of which there is inserted a link 306 which in turn is attached to a lever 307 having a pivotal mounting 308 carried by a bracket 309 projecting from the gate section 42. The end of the lever 307 opposite to that to which the link 306 is attached is turned substantially at right angles to the body portion to provide an annular portion 310 which is substantially arcuate and adapted to receive a relatively long slot 311 in which the pin 77 moves. The link 306 is preferably continued beyond the plane of the lever 307 to provide a post 312 for cooperation with a tension spring 313 so positioned as to snap the lever 307 in one direction or the other, after it has been moved a predetermined distance in such direction, the elongated slot 311 constituting a lost motion connection between the parts.

By reason of this construction, it will be apparent that when the rod 48 is moved to the left as viewed in the drawings, it will be effective for rotating the lever 307 in a counter-clockwise direction and effecting thereby similar rotational movements of the fingers 301 from the locking position shown in Figure 1 to the inoperative position shown in Figures 6, 4b, and 4c. As such fingers 301 are moved into a position substantially normal to the longitudinal axis of the rod 303 and within the limits of the gate section 42, the gate section 46 is moved relatively to the section 42 thus opening the gate and permitting the removal of a previously displayed film and the lateral insertion of another. Movement of the rod to the right, however, will perform the opposite function. The fingers 301 will be rotated to the left, as viewed in Figure 4b, immediately with the beginning of the closing movement of the gate, and will at once sweep completely into the gate and into the film path generally and into proper lateral position relative to the feeding sprockets any film which may have been positioned within the general area of the gate or near to the sprockets. Such bodily positioning will take place well in advance of the completion of the closing movement of the gate and of the completion of the movement of the shoes and guides relatively to the sprockets, thus insuring the proper positioning of the film and precluding the possibility of an edge of the film being caught by the side of the gate or the perforations in the film being other than in proper lateral alignment with the teeth of the sprockets.

It will be understood that these positioning members form a portion of the channel in which the film is initially threaded by end-wise propulsion, as is later described, and through which it is fed and rewound.

Conveniently positioned above and below the gate, we place conventional continuous sprockets 89 and 90, the former hereafter called the supply or delivery sprocket, to draw film from the supply reel, and the latter, hereafter called the take-up sprocket, to take film away from the intermittent or feeding sprocket 50 and move it toward the take-up reel.

The supply sprocket 89 we preferably position within the curved upward portion of the guide member 80 so that if the film is removed from the apparatus by a movement lateral to its ordinary course of travel therethrough, it will be easily guided from such sprocket. As is clearly shown in Figure 4, we mount such sprocket 89 upon a shaft 91, which is supported by the main frame and by a bracket 92. Loosely mounted upon the shaft 91, we place a spiral gear 94 to the right side of which is attached a serrated disk 95. Further to the right, we mount upon the shaft 91 for longitudinal movement relative thereto and rotational movement therewith a clutch collar 96 with an annular depression 97 for cooperation with the clutch fingers later described and terminating to the left in a serrated disk 98 for appropriate engagement with a serrated disk 95.

For actuating the take-up sprocket 90, similar mechanism may be provided. As is likewise clearly shown in Figure 4, we mount such sprocket 90 upon a shaft 100 which is supported by the main frame and by a bracket 101. Loosely mounted upon the shaft 100, we place a spiral gear 102 to the right side of which is attached a serrated disk 103. Further to the right, we mount upon the shaft 100 for longitudinal movement relative thereto and rotational movement therewith a clutch collar 104 with an annular depression 105 for cooperation with the clutch fingers later described and terminated to the left in a serrated disk 106 for appropriate engagement with a serrated disk 103.

As is clearly shown in Figure 4d, upon the hub of gear 102, a spiral gear 108 may be cut, or such gear may be attached to gear 102 in any desired manner. The gear 108 is supported by the bracket 101 and meshes with a suitable gear 107 pinned to the power shaft 21. Engaging with the gear 102 is a gear 108', such gear being pinned to a shaft 109 which is mounted in a bracket 110 supported by the frame F. To the opposite end of such shaft, there is pinned a gear 111 which drives the gear 94.

Suitable housings, not shown, may be supplied for all gears by a casing, not shown. If desired, the entire apparatus may be mounted in a cabinet.

As is clearly shown in Figures 4 and 4a, we provide stripping and protecting shields 115 and 116 cooperating with the continuously driven sprockets 89 and 90, and similar in operation to the shield 71 which cooperates with the feeding sprocket 50. These shields when in shielding position form a part of the threading and rewinding channels.

The shield 115 is mounted upon the shaft 91, and has pinned to its inner or left hand extension, as viewed in Figure 4, a pinion 116' which meshes with a toothed bar 117 supported as in a bearing 118 and at its opposite end engaging with a pinion 119 which is mounted for movement with the pinion 73.

Similarly, the shield 116 is mounted upon the shaft 100 and has pinned to its inner extension, viewed as above, a pinion 120 which meshes with a toothed bar 121, supported as in a bearing 122, and at its opposite end engaging with a pinion 119 which is mounted for movement with the pinion 73.

Each shield terminates in an inwardly curved extension, narrower than the axial distance between the teeth of the sprocket, thus, as is common in the motion picture art, stripping the film from the sprocket during the feeding operation and hence preventing it from following the teeth too far. It will be recognized that such stripping is entirely different from the primary function of such shields—to wit, the bodily removal of the film from the feeding members and its complete protection therefrom.

The operation of such shields will be obvious from Figure 4a. As the rod 48 is moved, in the manner previously described it will be effective for operating the shield 71, and, with it, the shields 115 and 116. Thus the movement of the rod 48 to the left as viewed in Figure 4a will be effective to move all shields from the full line positions to those shown in dotted line, in timed relation to the opening of the gate, thus removing the film from the teeth of the sprockets and completely shielding it therefrom.

Film guides and film retaining members cooperating with the gate and with the feeding mechanisms are provided.

A film retaining element, preferably consisting of three rollers or idlers 123, relieved as is common in the motion picture art, is mounted upon the right of an arm 124, as viewed in Figure 4, which is mounted upon a plate 125 which is attached to and pivoted upon a stud 126 extending through the frame F and attached to a downwardly extending arm 125', such retaining element being held in cooperative relation with the supply sprocket 89 by the tension of a leaf spring 127a.

An upper loop guiding element, preferably consisting of a curved plate 127, is pivotally mounted upon a pin 128, extending from the main frame adjacent the upper portion of the gate, and attached to an arm 129 to which is connected a link 130, such link being attached by a pin to an elongated slot 130' in an arm 130'' attached to a gate control rod 152, as is clearly shown in Figure 1c.

A similar retaining element, preferably consisting of three rollers or idlers 131, relieved as is common in the motion picture art, is mounted upon an arm 132, which is mounted upon a plate 132', which plate is attached to and pivoted upon a stud 133 extending from the front of the frame F.

A lower loop guiding element, preferably consisting of a curved plate 134, is pivotally mounted upon a pin 135, extending from the main frame adjacent the lower portion of the gate. Attached to such plate 134 is an arm 136 which by means of a pin extending therefrom into an elongated slot 136' of a link 137 is attached to and moves with the movable gate section 46.

To actuate the film retaining element positioned adjacent the lower portion of the gate in timed relation with the film retaining element position adjacent the upper portion of the gate, the plates 125 and 132' are joined by a link 138.

By reason of such construction, it will be evident that when the plates 125 and 132' are moved upwardly, as viewed in Figure 2, by means later described, the film retaining rollers 123 and 131 will likewise be moved upwardly away from the sprockets 89 and 90. By means later described, the loop guiding plates 127 and 134 will likewise be moved downwardly, thus completing the track or path for the film from the supply sprocket through the gate to the take-up sprocket, such movements of such elements being effective to facilitate the positioning of a new film or the edge-wise removal of one already displayed. Similarly, the downward movement of the plates 125 and 132' will be effective to bring the guiding elements 123 and 131 into co-operative relation with the sprockets 89 and 90 respectively, thus positioning the film thereupon and retaining it in cooperation therewith. By means later described, the guiding plates 127 and 134 may be simultaneously moved upwardly and away from the film track, thus permitting the unimpeded production of the loops of slack film, in the manner later described.

Mechanism adapted automatically to position the film in correct relation to all of the feeding members including the take-up spindle and to guide the film as it is propelled from the supply spindle to the supply sprocket, it is to a large extent shown in Figures 1, 1a, 1b, 3 and 31 to 35 inclusive. This mechanism per se is described in our co-pending application filed concurrently herewith Serial Number 10,559.

Pinned to the inner portion of the take-up spindle 3 there may be provided a pinion 401 which meshes with a relatively large gear 402 loosely mounted upon a shaft 403 carried by a take-up operating control plate 404. Mounted upon the right hand surface of such gear 402 as seen in Figure 32 is a cam plate 404' which is adapted to control a trigger 405 slidably mounted upon pins 406 upon the plate 404 and urged downwardly by a spring 407 attached to pins 408 and 409 affixed respectively to the trigger and to the plate 404.

As is clearly shown in Figure 34, the lower end of the trigger 405 by means of a pin 410' working in an enlarged slot 410'' is attached to a first latch 410 which latch by means of a pin 411 is loosely mounted upon the control plate 404. Such latch may consist of a toothed portion 412 urged outwardly by a light spring 413, the head of such trigger bearing against a protuberance 414 upon a second latch 415 which second latch is mounted upon a pin 416 affixed to the lower edge of the plate 132' and held upwardly as viewed in the drawings by a spring 418 one end of which is pinned to the plate 132' and the other end of which is pinned to the latch 415. The movement of such trigger is limited by a projection 419 bearing against a pin 420 upon the plate 132'. Downward movement of the trigger 405 will be effective, as clearly appears from the drawings, for moving the first latch 410 and the second latch 415 downwardly, thereby releasing a head 422 of the second latch and a detent 423 which is formed upon an arm 425 extending upwardly from and movable with the main control plate 404. Following such release, it is obvious that the left hand end of such main control plate 404 will move downwardly from the position shown in Figure 31 to the position shown in Figure 33, such movement being accomplished by a spring 426 and limited by a pin 427. Formed in an extreme left extension of the plate 404 is a slot 430 in which a pin 431 attached to an arm 432 operates, such arm being pinned to a shaft 433 to which also a gear 434 is pinned which gear meshes with a gear 435 pinned to a shaft 436. To such shaft is fixed an upwardly extending arm 437. Projecting forwardly from such arm 437 is a guiding element 440 which terminates to the right as viewed in the drawings in a circular surface 441 which is adapted to coact with a hub 442 of a carrier 443 placed upon the take-up spindle 3. Attached to the shaft 433 is an arm 445 which carries at its forward end a guiding element 446 likewise terminating at its right hand portion in a circular plate 447. A guiding member 448, fixed to the frame F, co-operates with the guide 440.

Similar guiding members for a carrier 450 placed upon the spindle 2 are provided. As is clearly shown in Figure 35, such guiding members are operated by a link 451 extending from the previously described arm 432 to an arm 452 affixed to a gear 453 which meshes with a gear 455, connection between the link 451 and the arm 452 being accomplished by a pin working in a relatively elongated slot. As is clearly shown in Figure 1a, such gears are suitably mounted upon a bracket 456 which extends from the main frame F. Attached to the gear 455 is an upper guide element 458 terminating to the right in a guide roller 449. Attached to the gear 453 is a main lower guide element 459. Carried upon such guide member 459, is a guide shoe 460, mounted upon pins 461 and 462, such pins working through slots in the member 459. Between the pins 461 and 462 is a compression spring 463 coiled about a rod 464. Substantially horizontal movement of the guide 460 is obtained by a connection between such guide and the link 451, such connection comprising an arm 465 attached to guide shoe 460, a pin extending from such arm and working in a relatively long slot in an upper right angled extension 466 of a pivotally mounted link 467, a lower right angled extension 468 of such link being attached to the link 451 by a pin working in a relatively long slot. It will thus be evident that the movement of the link 451 and consequently the arm 452 will be effective to bring together or apart the guide elements 458 and 459, and to move the shoe 460 toward or away from the spindle 2.

Embracing the periphery of the supply reel 450 there may be provided a guiding element 470 whereby the film upon the revolution of the reel 450 is prevented from leaving the reel except through the opening between the guiding elements 458 and 460.

In order to form a completely enclosed channel or track for the film, all guiding elements and the film retaining elements—including members 123, 127, 131, 134, 440, 446, 448, 458, 459 and 460—are preferably provided with both outer and inner sides or flanges which form contact with each other or with the appropriate portion of the apparatus, when such members are in the operative or guiding position, to form such enclosed channel. For clarity, such sides or flanges are largely omitted from the drawings. Their construction may be as indicated in Figure 52. Guiding element 470 may be provided with such an outer flange.

For controlling the operation of the apparatus in the manner desired, there is preferably provided a single control member in the form of a knob or button 139 projecting through a substantially U shaped slot 140 in the supporting base B. This slot is so shaped as to provide five operating stations designated respectively S1, S2, S0, S3, and S4. The button 139 is adapted to be moved at will so that the control mechanism will occupy any one of these stations. With the control at the station S1, the respective parts of the apparatus are in such position as to insure the normal projection of pictures as usual motion pictures. With the control button at station S2, there is obtained a so-called still or stereoptican projection, the movement of the button from the station S1 to the station S2 being effective for disengaging the respective driving mechanisms which are in operation during the projection of pictures in motion. With the control button at the intermediate position, station S0, mechanical timing of the actuation of the control and guiding mechanisms becomes automatically operative. With the button in position at station S3, the respective parts of the apparatus are in such position as to permit the positioning of a film therein or the removal of a film which has just been fed therethrough. It will be understood that the movement of the button from station S0 to station S3 automatically produces the required change in the operating position of the parts. With the button in position at station S4, the respective parts of the apparatus are in such position as to permit rewinding of the film by means of the motor M. The movement of the button from station S3 to station S4 automatically produces the required change in operating conditions necessary for such rewinding.

The control mechanism actuated by the control button 139 is to a large extent shown in Figures 7 to 23 inclusive of which Figures 7 to 10 inclusive illustrate the change in the position of the parts following the movement of the control button to the respective stations. The control button 139 is attached to the control mechanism in such manner that the connection therebetween is automatically destroyed or re-established in accordance with the operating requirements of the apparatus. Such button may be mounted upon a pin 142 having a head 143 against one side of which bears one end of a compression spring 144 (Figure 48—Sheet 11). The opposite end of such spring bears against a flange 145 extending inwardly from the control button 139. By reason of this construction, it will be apparent that the button may be moved vertically on the pin 142 but that the spring 144 will normally be effective for urging the button downwardly. At its lower end, the button 139 has a collar 146 of a diameter substantially to conform to the contour of the slot 140 as enlarged at each of the respective operating stations except station S0, whereby with the button in its lower position accidental movement from one of these stations is prevented. The lower end of the pin 142 is attached to a sleeve 147 which is slidably mounted upon a lever 148. Such lever 148 is mounted upon a lever 149. Headed pins 150, attached to the lever 149, extend through slots 151 adjacent each end of the lever 148. The lever 149 is operated in conjunction with a gate control rod 152 journalled in a bearing bracket 153 projecting from the rearward side of the main frame M. As is clearly shown in Figure 7a (Sheet 7) attached to such a rod 152, is a pin 152' which operates through an opening in the collar 149' which is loosely mounted upon such rod 152 and is pinned to the rotating lever 149. By reason of this construction the lever 149 is restricted in movement to rotation only. The combined sliding and rotating lever 148 is effectively mounted on the rotating lever 149 for rotational movement simultaneously therewith and sliding movement independently thereof. Projecting downwardly from the lever 148 is a pin 154 with which a hook 155 pivoted upon a pin 156 attached to the sleeve 147 is adapted to cooperate.

Pivoted upon a pin 157 substantially in line with the portion of the slot 140 extending from station S3 to station S0 is a block 158, normally urged downwardly by a spring 159, upward movement being limited by a pin 160 with which the left hand projection of the block is adapted to contact. Positioned below such block is a pawl 161 pivoted as upon a pin 162 and urged to the right by a spring 163 against a pin 164. Urging the sleeve 147 downwardly as viewed in Figures 7 and 8, there is provided a spring 165 mounted about the rod 166 which may be supported in any desired manner by such sleeve and by the lever 148.

Figure 9:
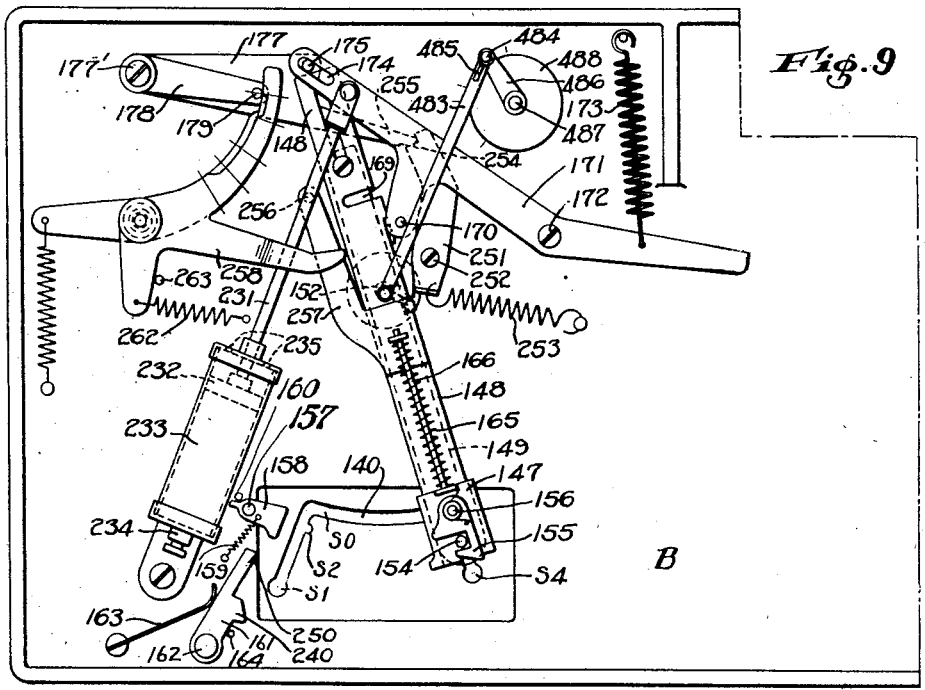
Figure 9 is a partial bottom plan view showing actuating levers in "film threading or changing" position, with the control button at station S3.
Figure 10:
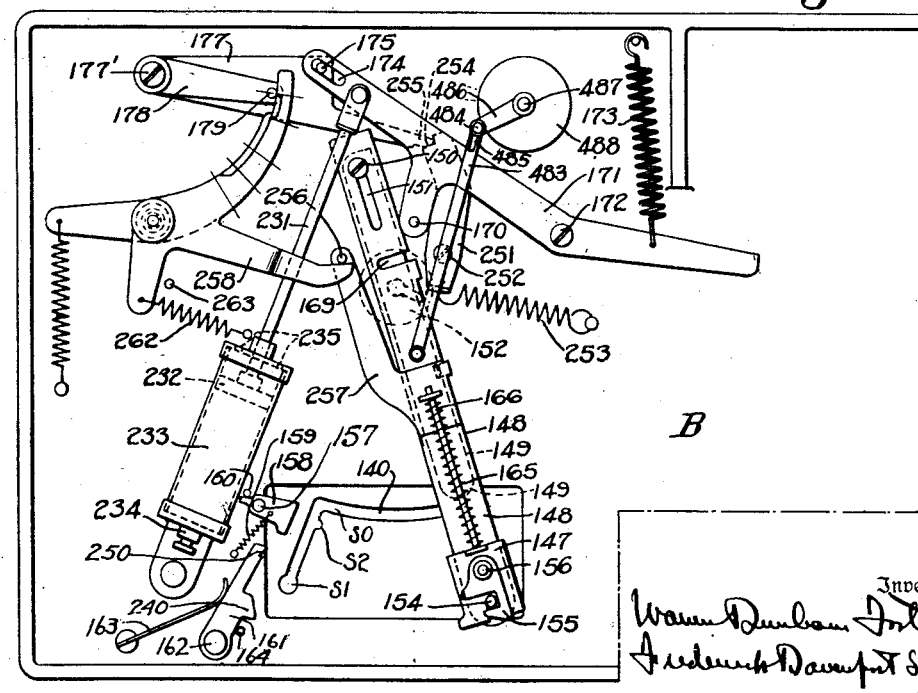
Figure 10 is a partial bottom plan view showing actuating levers in "rewind position", with the control button at station S4.

By reason of the above construction, it will be evident that when the combined rotating and sliding lever structure is rotated to the left as viewed in the above mentioned figures from the position S3 slightly beyond the position S0, the left projecting nose of the hook 155 will engage with the block 158 and will thereby be forced to the right from the position shown in Figure 9 to that shown in Figure 7, thus destroying the relationship between the control button 139 and the actuating lever 148 and permitting the power-operated portion of the control mechanism to complete the actuation of the apparatus wholly independently of the user.

At a point intermediate its length, the combined rotating and sliding lever 148 is furnished with a transversely extending recess 169 adapted to cooperate with a pin 170 projecting from a lever 171, pivoted upon the pin 172, the longer or left hand end of such lever, as viewed in Figure 7 or 8 being urged downwardly by a relatively powerful spring 173. In a slot 174 in one end of such lever 171 is mounted a pin 175 attached to a control plate 177 which by means of a collar 177' is attached for rotation to a control plate 178 in the other end of which plate is inserted a post 179 which operates feeding control arms 180, 181, 182, 183, and 258. To the first four mentioned of such arms are attached coaxial upwardly extending sleeves 184, 185, 186, and 187 respectively, the rotation of which is effective to actuate the various feeding clutches. Such sleeves surround a control rod 188 which operates the re-winding and supply spindle clutch, such rod being operated by the control arm 258. Such sleeves and rod are journalled for rotation in the base of the machine and in the bearing 190 extending from the main frame.

As will be clearly seen from Figure 12, springs 192, 193, 194, and 195, attached suitably to control arms 180, 181, 182, and 183 respectively and to a post 196, are employed to hold such control arms in contact with the post 179, and a spring 262 performs the same function of control arm 258.

Reference to Figures 13, 14, 15, 16, 17, 18, and 2 will make clear the operation of the control arms and sleeves. Figures 14 to 18 inclusive are arranged in the order of operation of the respective parts, not of their physical arrangement.

The supply spindle clutch is controlled by the rod 188 and the control arm 258, as is shown in Figures 14 and 2.

At its free end, such control rod carries the previously described yoke and pins 33*l* and 33*m* cooperating with the grooves 33*j* and 33*k*. As the post 179 extending from the arm 178 is moved along the surface of the upwardly extending portion of the arm 258, it will enter a depression 258', thus permitting the rotation of the arm 258 in a counter clockwise direction as viewed in Figure 14, under the influence of a controlling spring 262 and thus moving the yoke to the right as viewed in Figure 5 and connecting the supply spindle 2 with the shaft 18 which drives the take-up spindle 3. As the post 179 moves further downwardly, out of the depression 258', it will again force the arm 258 and the yoke to inoperative position.

The supply sprocket clutch is controlled by arm 180 and sleeve 184, as shown in Figures 15 and 2.

Extending from the control sleeve 184 is an arm 201 which operates a link 202 which through an arm 203 is effective to rotate a rod 204 supported by a bearing 205. Forked arms 206, supporting in their outer extremities fingers 207, extend from such rod 204, such fingers being positioned within the groove 97 of the feeding sprocket clutch collar. The rotation of the arm 178 in a clockwise direction as viewed in Figure 14 will force the post 179 into contact with the protuberance 209 of the arm 180, thus moving such arm to the dotted line position, and similarly rotating the control sleeve 184 and moving the control fingers 207 and the supply sprocket clutch collar 96 to the left as viewed in Figure 4, thus making such clutch operative. During further movement of the post 179, the arm 180 will remain in operative position. The contrary movement of the arm 178 will permit the arm 180 to return to inoperative position, after the post 179 has passed above the protuberance 209, as viewed in Figure 15.

The shutter or intermittent feeding clutch is controlled by the arm 181 and sleeve 185 as shown in Figures 16 and 5.

Extending from such sleeve 185 are forked arms 211 from the ends of which project clutch pins 212 which coact with the groove 63 of the collar 62. The rotation of the arm 178 in a clockwise direction as shown in Figure 16 will force the post 179 into contact with a protuberance 213 of the arm 181, thus moving such arm to the dotted line position, and similarly rotating the control sleeve 185 and moving forked arms 211 and pins 212 to the left as viewed in Figure 2, thus making the shutter or intermittent feeding clutch operative. Such further movement of the post 179 will cause the arm 181 to move back into the full line position of Figure 16, urged by the spring 193, thus declutching the intermittent shaft. As the post 179 is moved over a protuberance 214, it will again move the arm 181 to the right as viewed in Figure 16, thus again actuating the intermittent sprocket and shutter. The effect of the contrary movement of the arm 178 will be obvious.

The take-up sprocket clutch is controlled by the arm 183 and the sleeve 187, as shown in Figures 17 and 2.

To such sleeve 187, there may be attached an arm 215 from which a link 216 extends to an arm 217 attached to the shaft 218, suitably journalled in a bearing 219 and a bracket 220, and having attached thereto arms 221 carrying pins 222 which cooperate with the groove 105 in the driving portion of the take-up sprocket clutch. The rotation of the arm 178 will be without effect upon the control plate 183 until the post 179 engages a protuberance 223, thus forcing it into the dotted line position shown in Figure 17, rotating the sleeve 187 and forcing the pins 222 to the left as viewed in Figure 4, thus actuating the take-up spindle clutch. Such further movement of the post 179 will cause the arm 183 to move back into the full line position of Figure 17, urged by the spring 195, thus declutching the take-up sprocket clutch. As the post 179 is moved over the protuberance 223', it will again move the arm 215 to the right as viewed in Figure 17 thus again actuating the take-up sprocket clutch. As the post 179 is moved in a contrary or upward direction, the control arm 183 will again occupy the full line position, thus rendering the take-up sprocket again inoperative.

The take-up spindle clutch is controlled by arm 182 and sleeve 186, as shown in Figures 18 and 2.

The forked arms 197 may extend from the sleeve 186 and carry pins 198 which engage the groove 25 of the take-up spindle clutch. The rotation of the arm 178 in a clockwise direction as viewed in Figure 18 will force the post 179 into contact with the protuberance 199 of the arm 182, thus moving such arm to the dotted line position, and similarly rotating the control sleeve 186, and moving the control fingers 198 toward the frame F as viewed in Figure 2 and toward the right as viewed in Figure 5, thus making the take-up spindle clutch operative. The effect of contrary movement of the arm 178 will be obvious.

In order definitely to time the travel of the control mechanism from station 0 to station 1 and hence to time the operation of the loop or slack creating mechanism, a dash pot is provided. Suitably connected to the arm 171, is a piston rod 231, a piston 232 working in a cylinder 233 which is pivotally attached to the base B. An adjustable port 234 is provided, whereby the escape of the air may be regulated at will. Usual escape openings 235 are provided in the opposite head of the cylinder.

Pivotally attached to the upward portion of the combined sliding and rotating lever 148 is a link 483 the other end of which by means of a pin 484 working in an elongated slot 485 is pivotally attached to an arm 486 pinned to a stem 487 of a snap switch 488 such switch controlling both the motor and light circuits of the apparatus.

To illustrate the actuation of the device to project motion pictures, it will be assumed that the user places the film upon the spindle 2 and moves the control button from station S3 to the intermediate station S0, (see Figure 13). Such movement, as will be made fully apparent in a following portion of this specification, will have rotated the gate control rod 152 thereby having retracted the stripping shields 71, 115, and 116, moved the shoe 85 and the guiding rollers 123 and 131 toward the sprockets 50, 89, and 90, moved the guides 127 and 134 away from the sprockets 89 and 90, completely actuated the positioning fingers 301, partially closed the gate and moved the guiding elements 458 and 459 toward each other, forming a completely enclosed path or tunnel for the film, and similarly moved the guides 440 and 447 toward each other. The guide shoe 460 will be pressed against the film upon the supply reel 450, the light spring 463 bringing it into contact with the film irrespective of minor variations in diameter of the mass upon the reel and projecting the outer film from injury from the shoe. When the control button reaches station S0, as has previously been described, the mechanical control mechanism will become operative, and will move the sliding lever 148 from station S0 to station S1, necessarily at a uniform and predetermined speed, the actuating spring 173 being governed by the dash pot. Simultaneously therewith the control post 179 will move from the position in which it is shown in Figure 14 to that in which it is shown in Figure 18. During its passage through the zone which is indicated as A in Figures 13 to 18 both inclusive, it will actuate the supply spindle, the supply sprocket, and the intermittent sprocket. Such actuation of the supply spindle will be effective to revolve the supply carrier in a feeding direction. Escape of the end of the film, except through the passageway framed by the guiding members 458 and 460 and 459 is prevented by the guiding ring 470, and the guiding shoe 460 is effective for picking up the free end of the film and guiding it into the passageway. What slight scratching effect, if any, is produced by the shoe is immaterial since the leader or forward end of the film is ordinarily not image bearing. Continued revolution of the supply carrier forces this free end of the film to the supply sprocket 89, with which it engages. Such sprocket feeds it on to the intermittent sprocket 50 with which it engages, such sprocket being operated for a relatively brief period merely to assure such engagement. At that moment, the post 179 becomes ineffective upon the supply spindle clutch and the intermittent sprocket clutch, since it passes beyond the above mentioned depression and protuberances, and the supply spindle and intermittent sprocket becomes motionless. The upper loop guide 127 will be withdrawn from guiding position, in the manner later described, and the gate is maintained partially open, with the positioning fingers in locking position. Between zones B, and D in the manner previously described, such post 179 will continue to operate the several sprockets in ways which will furnish the necessary unsupported loops of slack film as described and claimed in our parent patent. During zone D, the post 179 will form contact with the protuberance governing the take-up spindle. Thus the free end of the film will be fed to the carrier upon the take-up spindle, which will begin to revolve at approximately the time the film reaches such carrier, the loops having been formed.

As will be clearly seen from Figure 47 (Sheet 3), the movement of the sliding lever 148 will be effective to move a projection 482 thereon into contact with a pin 152' attached to the gate control rod 152 thus further rotating such rod. Such rotation commences in zone B and is first effective to move the arm 130" whereby through the link 130 the upper loop guide 127 is moved to inoperative position and the final gate closing movement begins. Attached to the lower extension 127g of such guide is the roller 127h which, after the movement of the guide to inoperative position, bears lightly against the surface of the film affording sufficient resistance to its passage downwardly through the gate to insure the formation of the upper loop when the supply sprocket alone is actuated. The continued rotation of rod 152 in zone C is effective to complete the closing of the gate and to retract the lower loop guide 134 through the operation of the slotted link 137. When the gate is completely closed, the roller 127h rests within the surface of the movable section 46 and out of contact with the film.

As the film is fed forwardly by the simultaneous operation of all of the feeding sprockets it is forced through the passage way formed by the guiding elements 446 and 440 and around the hub 442 of the take-up carrier 443 upon the take-up spindle 3, the film being guided about the revolving hub by the circular guiding plates 441 and 447. The direction of the natural curl in the film is such as to be effective to make its leading end portion coil itself around the hub 442 as the film is advanced by the feeding sprockets. If desired, a conventional spring may be placed within the guide to assist in this operation. The continued powered operation of the driving spindle 3 and the carrier 443 thereupon will be effective to wrap the film about the hub 442 thus firmly attaching the end of the film thereto. After a predetermined number of revolutions of the spindle 3, the pinion 401 will have been effective to have completely revolved the relatively large gear 402 from the position shown in Figure 31 to that shown in Figure 33. The ratio of the pinion 401 to the gear 402 may be any which is found effective, it being preferred under some circumstances that such ratio be approximately 10 to 1 whereby the guiding elements are moved to inoperative position after ten revolutions of the hub 442. As the cam plate 404' is moved slightly beyond the position shown in Figure 31, the trigger 405 will be moved sharply downwardly by the spring 407 thus moving the latch 415 downwardly and permitting the detent 423 to be freed thereby and the operating plate 404 to move from the position shown in Figure 31 to that shown in Figure 33, such movement being effective for separating the guiding elements 447 and 441, and 446, and 440, and 458, and 459 and 460, and also moving the gear 402 away from and out of connection with the pinion 401. It will thus be seen that the various guiding elements are moved to inoperative position without placing the slightest strain upon the film, and that they are so moved in definitely timed relation to the beginning of the operation of the take-up spindle, which in turn is actuated in a definitely timed relation to the actuation of the other feeding member and the closing of the gate.

Prior to the movement of the lever 148 downwardly from station S0, the sleeve 147 and the manual control button carried thereby, as has been previously described, are held by the engagement of the bottom of the sleeve 147 with the top of the pawl 161. As the lever 148 completes its downward movement to station S1, the pawl 161 will be forced to the left by engagement between the extension 240 thereupon and the side of the lever 148. At this point, such parts will be in the position shown in Figure 7. Thereupon the spring 165 will move the control sleeve 147 and the control button 139 downwardly. The hook 155 will pass first to the left of the pin 154 and thereafter, urged by the spring 241, will move to the right and engage therewith thus re-establishing the connection between the manually operable control button 139 and the control mechanism.

Mechanism by which the user may examine one picture at leisure is described in our parent patent. To show a still picture, he moves the control button to station S2. In moving from station S1 to station S2, the switch 488 will remain on, so that light is supplied for the still picture, but during the latter portion of the movement to station S0, the switch will snap off, thus rendering motor and light inoperative.

It may be assumed that after the projection of a single image from the film or the repetitious projection thereof, or after the projection of pictures in motion, it is desired to change the film. Under such circumstances the control button will be manually moved from station S2 or station S1 to station S0. Such movement will be effective for rendering inoperative the various feeding clutches and for breaking the light and motor circuits. As is clearly shown in Figure 47, it will also be effective for bringing an extension 493 upon the sliding lever 148 into contact with the lower end of the pin 152' thereby locking such pin into contact with the collar 149' and, by further upward movement, rotating the rod 152 and thereby accomplishing the first gate opening movement. As is clearly shown in Figure 7a, such extension 493 terminates downwardly and to the left as viewed in such figure in an offset portion 494 which is effective for engaging with the pin 152' after such pin, by the downward movement of member 493, has been moved completely beyond the edge of the levers 148 and 149.

Movement of the control mechanism from station S1 to station S0 will be effective for again placing the spring 173 under tension and resetting the dash-pot. Such movement also will be effective for moving the combined swinging and sliding lever structure against the shouldered side of the detent 251, which is pivoted on the stud 252 under the influence of the spring 253, so that its projecting shoulder 254 will engage with the tooth 255 of the lever 177 before the pin and the slot have been removed from cooperative relation, thus holding locked in inoperative position all the clutch control means, dash-pot and spring and consequently the loop or slack creating mechanism. As the control button 139 is further rotated to the right as viewed in Figure 9, the pin 170 and the recess 169 will be completely removed from cooperative relation and the gate control rod 152 will be further rotated in a counter-clockwise direction.

Such rotation of the gate control rod is effective for opening the gate, for moving the film rollers and guides 123, 127, 131, and 134 and their associated parts to film threading position, and for so actuating the stripping shields 71, 115, and 116 as to effect the desired bodily removal of the film from the sprockets 50, 89, and 90 and the shielding of such sprockets so as to facilitate the threading of a new film into position or to permit the re-winding of a film. Such movement is also effective to move the positioning fingers 301 to inoperative position.

Adjacent its upper portion there is secured to the gate control rod 152 an arm 252' to which is attached a link 253' attached to the arm 125 previously described (Figure 2a). Movement of the control button from station S0 to station S3 will be effective for rotating the gate control rod in a counter-clockwise direction as viewed in Figure 9 and moving the link 253' to the right as viewed in Figure 2 thus, as will be apparent by reference to Figure 50 (Sheet 11), moving a pin 127b over the center of a slot 127c in an upper right angled extension 127d of a spring 127a attached to the main frame F, and quickly raising the film retaining or idler rollers 123 and 127 to relatively distant relation to the sprockets 89 and 90 respectively. Such upward movement of the control plate 132' upon the pivot 133 will be effective to move the trigger 415 to the left as viewed in Figure 33 and its tooth 422 into engagement with the detent 423 affixed to the upwardly extending arm 425.

Such rotation of the gate control rod 152 in a counter-clockwise direction as viewed in Figure 9 will also be effective to move an arm 254' attached thereto to the left as viewed in Figure 3, thus through the medium of a pin 255' attached to the gate control rod 48 moving such rod to the left as so viewed, thus separating the gate sections, moving the positioning fingers to inoperative position, and actuating the stripping shields (Figures 4a and 6a). The accelerated motion provided by the sping 127a is effective for preventing interference between the idlers and the stripping shields. Such rotation of the rod 152 will also be effective, through the arm 130" attached thereto, the pin working in the elongated slot 130' therein, and the link 130 (Figure 1c) to move the upper loop idler to guiding position and adjacent the supply sprocket 89. The lower loop guide 134 cooperating with the take-up sprocket 90 is directly operated by the movable section 46 of the gate.

If it is not desired to change a film, the control button may be moved from station S3 to station S4, or may be moved from station S1 or S2 to station S4 without stopping at an intermediate station. This movement will be effective for actuating the switch 488 and bringing a pin 256 attached to a plate 257 attached to the sliding and rotating lever 148 into engagement with the lever 258 and moving it from the position shown in Figure 9 to that shown in Figure 10, thus rotating the rewinding spindle control rod 188. The distance from station S3 to station S4 may be such that the actuating block 482 upon the sliding lever 148 does not come into operative contact with the pin 152'. Thus the rod 152 and the various parts controlled thereby remain motionless. At its free end, this control rod 188 carries the previously described yoke. The rotation of the control rod 188 as occasioned by the movement of the control button from station S3 to station S4 will be such as to move the teeth 33i into contact with the teeth 33h, thus connecting the spindle 2 in driven engagement with the shaft 31, this engagement being such that the film may be rewound by the continued operation of the motor M. Such rewinding operation will be facilitated by the attachment of the inner or "trailer" end of the film to the core of the supply carrier, or the button may be moved to station S4 before all of the film has been fed through the apparatus. It will be readily understood that any undue strain upon the film during or at the conclusion of the rewinding cycle is obviated not only by the slippage between the driving pulley 37 and the collar 31', but also by slippage between the belt and its pulleys 37 and 38 previously described.

From the foregoing, it will be apparent that the operation of a single control button performs in succession those necessary changes in the operating positions of the various parts for permitting any desired condition of operation of the apparatus. Upon movement of the control button from station S4 to station S3, the rewinding clutch will be disengaged and the lever 258 moved into inoperative position against a pin 263 by the action of a spring 262, and the switch 488 turned off.

With the control button 139 at station S3, it will be understood that the gate is completely open, the positioning and locking fingers 301 in inoperative position, the guiding elements 127 and 134 relatively close to the film path, the film retaining rollers 123 and 131 completely withdrawn from the sprockets 89 and 90 respectively, and the guiding elements associated with the supply and take-up spindles in open position. The user thereupon places the reel 450 upon the spindle 2. It is not necessary that the end of the film be placed in any particular relation to the guiding elements. The user thereupon moves the control button 139 from station S3 to station S0. These two acts are the only ones which are necessary to place the apparatus in complete operation. Such movement of the button toward station S0 is effective for rotating the gate operating rod 152 through the pin 152' attached thereto, thus partially closing the gate, rotating the stripping shields into inoperative position, bringing the film retaining elements 123 and 131 into relatively close relation with the appropriate sprockets, and operating the positioning and locking fingers 301. Such movement of the control button toward station S0 is likewise effective to move the combined swinging and guiding structure into engagement with the detent 251 and to swing it in a clockwise direction against the action of its controlling spring 253 thereby to release the tooth 255 of the lever 171 from the holding action of the detent, and permitting the lever 171 and its associated parts to be subsequently operated by the spring 113 whereby the necessary loops will be formed, the switch turned on, gate closing completed, the necessary guides actuated, and the apparatus placed in full operation.

It will be readily understood that, if desired, the motive means provided for the control mechanism may be the electrical means described in applications of Warren Dunham Foster or of the said Foster as shown in Figure 53 hereof and Earle L. Parmelee, deceased, which were copending with our parent patent which upon January 16, 1934, matured as Patents Numbers 1,943,303 and 1,944,024 respectively as is shown in Figure 53 of the drawings. The actuation of the control mechanism for the purpose of rewinding the film or starting its movement or of controlling the gate and its associated parts may be accomplished in accordance with the automatic means set forth in said patents. In this figure, which corresponds to Figure 7 of this application, in the interests of simplicity the same reference characters as are used in the said patent and in Figure 7 hereof are applied in Fig. 53, those of the patent having a double prime character added and those of Figure 7 hereof having a single prime character added. Instead of moving the control structure between the various positions between S4 and S0 by hand and between S1 and S0, S1 and S2, and S2 and S0 by hand, the automatic film controlled electrical apparatus of the said patent is shown. As set forth in the said patent, the control disc 160" may be rotated through the pin 161" and the pinion 162" by the rack bar 163". The pin 154" (corresponding to the pin 109 of the patent) connects the entire control structure with the driving means therefor. The solenoids 168", 169" and 218" impart the desired motion to the control disc 160" exactly as does the manually operable control knob 139 previously described herein and the spring 173. When it is desired to make use of the electrically controlled mechanism, this knob may be latched in an inoperative position in any desired way, such, for example, as the one shown in the said patent. The circuits of the said solenoids are operated by the film exactly in accordance with Patent Number 1,943,303.

Preferably the motor is of a constant speed type or any desired form of voltage regulator may be placed in circuit with the motor, to prevent current fluctuations and consequent variations in speed.

Carried by the frame F and positioned in line between the filament of the light source L and the aperture 44 of the gate is a condensing lens 264' carried by a lens casing 264. This condensing lens as is usual in the art concentrates the light upon the aperture. Forward of the gate an objective lens O may be positioned as previously described, for example, within a holder 282.

The combined lighting resistance and ventilating unit may be contained within a housing H. Within this housing may be mounted in any desired manner a lamp L and a reflector, not shown. If desired, a variable resistance or rheostat may be provided for the motor circuit, in order to operate the apparatus at varying speeds.

A fan V may be attached to the rearward end of the armature shaft of the motor. It will be understood that such fan will be in operation concurrently with the operation of the light source.

Under certain conditions, it may be desirable initially to position the film according to a modified form of our invention. By actuating the feeding members, certain of the guiding members, the gate, and the shielding members in modified sequences from that described above—such first described sequence being designated for convenience as form "A"—automatic operation of the apparatus can be accomplished in a manner which for certain purposes has many advantages.

Such sequences when arranged according to the form of our invention known for convenience as form "B" are made clear by the diagram of Figure 19 and by Figures 20 to 24 inclusive.

In apparatus constructed according to such modification "B", the user places the full reel of film upon the supply spindle, and moves the control button from station S3 to station S0. Substantially simultaneously with the first gate closing movement, the spindle guides are made operative, and the shielding members retracted from the supply sprocket and the take-up sprocket only. Thereupon the film retaining members or idlers are brought into relation with such sprockets. In zone A, the mechanism actuates the supply spindle whereby the end of the film is propelled therefrom to the supply sprocket; the supply sprocket whereby the film is engaged thereby and propelled therefrom past the intermittent sprocket, which remains completely shielded from the film, to the take-up sprocket; the take-up sprocket whereby the film is engaged thereby and delivered to the take-up spindle; and the take-up spindle whereby the film is wrapped thereabout. At this point, with all feeding members inoperative, the gate closing is completed, the shielding member withdrawn from the intermittent sprocket, and the loop guides retracted. In zone B, and thereafter loops are made, as described and claimed in our parent patent. In zone D, the take-up sprocket and the take-up spindle are also actuated, the supply sprocket and intermittent sprocket maintained in operation, and the movement of the spindle guides to inoperative position is begun. The withdrawal of the spindle guides is gradual, as the mass of film builds up upon the take-up carrier.

It is obvious also that if desired the retraction of the spindle guides may be begun after the first positioning movement of the film, but under many conditions it is preferable not to withdraw such guides until after a further operation of all of the feeding elements in order to minimize the time required for placing a picture upon the screen.

For purposes of simplicity and clarity, in the following description we designate parts which are the same or similar to those previously described by the reference characters which were originally applied to such parts followed by the letter B.

Mechanism for sequentially operating the stripping and shielding members is to a large extent shown in Figure 36.

Cooperating with the intermittent sprocket 50B is the stripping and shielding member 71B mounted as previously described upon the shaft 53B. Attached to such shield is a relatively small pinion 73B which meshes with a mutilated arcuate rack 74B which is attached to and moves with a mutilated arcuate rack 74'B, both of such racks being operated by the arm 79B pivoted upon the post 75B. See Figure 37. The elongated slot 78B of such arm cooperates with the pin 77B attached to the gate opening rod 48B. Such arcuate rack 74'B engages with the gear 73'B which is loosely mounted upon the shaft 53B. To the gear 73'B is attached the gear 119B which is adapted to operate the rack bars 117B and 121B which in the manner previously described through the gears 116'B and 120B operate the shields 115B and 116B cooperating respectively with the sprockets 89B and 90B. By reason of this construction, it will be evident that the initial rightward movement of the gate opening rod 48B, as viewed in Figures 36 to 39, will be effective through the mutilated arcuate rack 74'B for rotating the gear 73B and moving the shields 115B and 116B immediately to the inoperative position as shown in full line in Figure 36. Such initial movement, however, will be without effect upon the small pinion 73'B since the teeth of the mutilated rack 74B will not engage therewith until after such rack has been rotated approximately one-half of the distance from the position shown in dotted line in Figure 36 to the position shown in full line. The final closing or rightward movement of the rod 48B will bring the teeth of the mutilated rack 74B in engagement with the teeth of the gear 73'B and will quickly rotate such gear and consequently move the shield 71B from the position shown in dotted line in Figure 36 to that shown in full line.

The mechanism for actuating the spindle guides, according to modification "B", is shown in Figures 36, 39, and 40.

In certain cases, the character "B" has been added to previously described parts which are employed in apparatus built according to this modification, such parts being formed as previously described.

The gear 434B is fixed to the shaft 433B, which is supported by the main frame, and to such shaft is attached the arm 445B which carries the guiding element 446B which terminates in the curved plate 447B. Meshing with the gear 434B is the gear 435B which is fixed to the shaft 436B, which is supported by the main frame, and to such shaft is attached the arm 437B which carries the guiding plate 440B which terminates in the curved plate 441B. Likewise fixed to the shaft 433B is the arm 430B which through the link 451B, the arm 452B and the gears 453B and 455B operates the guiding members, including the members 458B and 459B, previously described, which cooperate with the supply spindle and the supply sprocket.

To operate such mechanism, an arm 501 is pinned to the gear 435B and by means of a pin 502 working in a slot 503 of an arm 504, supported by a bracket 505, is connected to an arm 506 which is attached to a plate 507 attached to the head of a plunger arm 508 of a dash-pot 509 conveniently positioned under the base BB. Such plunger arm is carried in a bearing 510. Within a cylinder 511 of such dash-pot and about the plunger arm is positioned a relatively heavy compression spring 512 one end of which bears against the head 513 of the plunger and the other end of which bears against the inward end of a wall 514 of the cylinder. The escape of the air from the dash-pot is regulated by an adjustable vent 515, and usual exhaust openings 516 are provided. A latch 517 is attached to a plate 507 by a pin 518 and urged upwardly by a spring 519 against a pin 520. The forward end of the latch terminates in a head 521. To set and control the above described mechanism, an angular plate 523 is attached to the combined and sliding and rotating lever 149B.

By reason of such construction, it will be evident that when the combined rotating and sliding lever structure is moved from station S0 to station S3 the angular plate 523 will be brought into operative relation with the hook 521 of the latch 517. As such combined sliding and rotating lever structure is moved from station S3 to station S0, the spring within the dash-pot will be placed under tension and the spindle guiding members will be moved into operative position. As is clearly shown in Figure 39, the nose piece of the latch 155B and the pawl 158B are so constructed that the relation between the control button carried by the pin 156B and the control mechanism is not destroyed until the user has moved the button downwardly to a distance approximately equal to the diameter of the pin 156B thus preventing interference by the spring 512 with the action of the actuating spring 173. As the sliding lever 149B is moved downwardly under the influence of the spring 173, the operative connection between the angular plate 523 and the latch 517 will be destroyed, the plate moving from the position shown in dotted line in Figure 39 to that shown in full line, thereby permitting the spring 512 to operate the plunger 508 until it assumes the position shown in Figure 39 and gradually moves the spindle guiding elements to inoperative position.

Under many conditions, it is preferable to provide a relatively small vent 515 whereby the dash-pot permits only a slow movement toward inoperative position of the spindle guiding elements, this movement taking place substantially in direct relation to the building up of the mass of film upon the take-up reel and the change in the angular position between the film and the supply spindle. This relatively slow removal of the spindle guides is an added safeguard, since the guides are retained in guiding relation until all possibility of slippage between the film and the take-up spindle has been passed.

The construction of the control mechanism for the feeding members will be apparent from the foregoing portion of this specification, and by reference to the diagram comprising Figure 19, and Figures 20 to 24 both inclusive.

As the post 179B, following the rotation of the arm 178B, moves into the depression 258'B, the spring 262 will move the arm 258B to the left as viewed in Figure 20 and will operate the supply spindle clutch in a feeding direction until the post has moved beyond such depression.

The movement of the post 179B over the protuberance 209B will move the arm 180B downwardly as viewed in Figure 21 and so operate the supply sprocket clutch, such operation being interrupted as such post moves opposite the depression between 209B and 209'B and being resumed when it moves over such protuberance 209'B.

The movement of the post 179B will have no effect upon the intermittent sprocket clutch shown in Figure 22, until it passes over the protuberance 214B, from which point onwardly such clutch will be operative.

As shown in Figure 23, the take-up sprocket clutch will be operative as post 179B moves over the protuberances 223B and 223'B in the arm 183B and inoperative therebetween and again operative as it moves upon protuberance 223''B.

As shown in Figure 24, the take-up spindle clutch will be operative as the post 179B moves over the protuberances 199B of the arm 182B and upon the protuberance 199'B, and the clutch will be inoperative when the post is between these protuberances.

Contrary or counter-clockwise movement of the arm 178B will have an obvious effect.

The extensions 492B and 493B are so placed upon the lever 149B as to rotate the rod 152B so as to complete the gate closing movement in the beginning of zone B, as described above.

Many of the advantages of this preferred modification of our invention are evident from the foregoing portion of this specification. Among other advantages is the provision of definite independent timing means for the removal of the spindle guides, such timing means being operated in direct relation to the building up of the mass of the film upon the take-up reel, and actuated in definite timed relation to the actuation of the other guiding members, feeding members, and the gate. Other advantages arise from the provision of separate motive means for the operating mechanism for the spindle guides. By those skilled in the art, it will also be recognized that the above method of initially positioning the film is particularly valuable when an intermittent feeding member of the intermittent grip type is used, since both the feeding member and the film are motionless when the shielding member is withdrawn and since the take-up sprocket is momentarily operated to complete such initial positioning by a pulling movement.

Under certain other conditions, it may be desirable initially to position the film according to a second modification of our invention—designated for convenience as form "C".

The diagram designated as Figure 25 will make clear the operation of apparatus constructed according to such modification.

The user places the full reel of film upon the supply spindle and moves the control button from station S3 to Station S0. The first gate closing movement has no effect upon any member other than the movable section of the gate and the shoe carried thereby. In zone A, the mechanism operates the supply spindle whereby the film is propelled therefrom to the take-up spindle, all intervening feeding members being shielded and all guiding members being in guiding position, and operates the take-up spindle whereby the film is wound upon the carrier positioned thereupon. In zone B, the operation of both spindles is stopped. The shielding members are then removed, the film retaining members made operative, the loop guides retracted, the spindle guides moved to inoperative position, and the gate closing completed. Thereupon, the take-up spindle, take-up sprocket and intermittent member are each successively operated for a very brief period whereby the film is successively moved into full operative relation with each such member and the loops are formed. In zone D, all members are operated whereby the film is subjected to a normal feeding movement.

In the following description, we designate parts which are the same or similar to those previously described by the reference characters previously applied thereto followed by the letter C.

Figures 41 and 43 show the construction which may be employed to actuate the stripping shields in the timed relation made desirable by modification "C".

As previously described in connection with form "A" of our invention, the stripping shields 115C and 116C associated with the continuous sprockets 89C and 90C may be operated through the gears 116'C and 120C, the rack bars 117C and 121C, and the gear 73C which likewise operates the shield 71C associated with the intermittent sprocket 50C. Cooperating with the gear 73C is the mutilated arcuate rack 74C pivoted upon the stud 75C and through its upward extension 79C operated by the gate control rod 48C, the pin 77C affixed thereto working in the slot 78C of such extension 79C. During the first portion of the gate closing movement, the flat portion of the rack 74C slides over the face of the teeth of the gear 73C, holding the shields locked in shielding position. During the final gate closing movement, the teeth of the rack engage with those of the gear, and quickly rotate all the shields to inoperative position.

According to the method of operation which has been described above and, under certain other circumstances, it is desirable to operate the upper and lower loop guides 127C and 134C by means of the movable section of the gate, and to provide a period of dwell whereby the first portion of the gate closing movement is without effect upon such guides and the later portions of such gate closing movement is effective to move such guides from the guiding position.

As is clearly shown in Figure 44 (sheet 14), a plate 530 may be attached to the upper portion of the movable gate 46C, such plate including an L shaped slot 531 in which works a pin 532 attached to the arm 129C which operates the upper loop guide 127C. It will be evident that the movement of the gate control rod 48C and the gate section 46C will be without effect upon the pin 532 until such pin reaches the termination of the longer portion of the L shaped slot 531.

Further movement of the plate 530 to the right as viewed in Figure 44 will be effective quickly to rotate the shield 127C from the position shown in full line to that shown in dotted line.

To an extension 533 attached to the movable gate section 46C, there may be pivotally attached the link 137C, as shown also in Figure 1. The operation of such guide 134C through the arm 136C and the link 137C obviously will be similar to that previously described for the guide 127C.

In order properly to time the movement of the film retaining idlers to operative position, delayed actuation with rapid operation is desirable. Such movement may readily be secured by making use of the construction shown in Figure 41 in which the slot 127cC in the right angled portion of the spring 127dC is so shaped as to operate the arm 125C after a further movement of the rod 152 than that previously described.

When use is made of the modified method "C" of initially positioning the film, and under certain other circumstances, it may be desirable to operate the spindle guides directly by the mechanism which operates the gate and the other guiding elements, such mechanism being manually actuated but mechanically operated and timed.

As is clearly shown in Figure 41, the gears 434C and 435C are mounted upon the shafts 433C and 436C respectively affixed to the main frame and meshing with each other. As previously described, to the shaft 436 C is fixed the arm 437C which carries the guiding element 440C terminating in the curved plate 441C. The shaft 433C carries the arm 445C which supports the guiding element 446C terminating in a plate (not shown) which may be constructed substantially like the plate 447B. Attached to and extending from the shaft 436C is an arm 540 which through a link 541 is attached to a plate 542. Such plate is attached to a collar 543 which is freely mounted upon the gate control rod 152C. Such collar is constructed with slots 544 which engage with a pin 545 in the control rod 152C and with a groove 546 with which engage forked arms cut in the upper end of a right angled plate 547, which plate is supported in a bracket 548 and normally urged downwardly by a spring 549'. Likewise mounted upon such bracket is a manual control button 549 to which is attached a pin 550 which works within an opening in a plate 547. By reason of such construction, it will be evident that when the button 549 is rotated in an anti-clockwise direction as viewed in Figure 41 it will be effective for moving the collar 543 and the plate 542 upwardly out of operative engagement with the pin 545 and hence the gate control rod 152C thus permitting the manual operation of the spindle guides. Such manual operation can be accomplished by the use of the control button 552 attached to the gear 434C. In order to hold the guides against accidental movement, the arm 445C may be formed with a detent slot 553 with which cooperates a pin 554 pressed upwardly by a spring 555 in a cylinder 556 supported upon a bracket 557 attached to a main frame.

An arm 430C through a link 451C, arm 452C and gears 453C and 455C may operate the supply guiding members 458C, 459C and 460C (not shown) in the manner previously described in connection with the forms of our invention designated for convenience "A" and "B".

It will be evident that when the gate control rod 152C is rotated so that the slot 543 and the pin 544 coincide, the automatically operative control mechanism will again become effective. If desired, a detent may be applied to button 549 whereby the link 541 may be maintained out of possible contact with the pin 545 until the operator moves such button in a clockwise direction.

Such manually operative mechanism will be useful in case the operator wishes to re-wind and then re-project a portion only of the film and under other circumstances.

The construction of the control mechanism for the feeding members will be apparent from the foregoing portion of this specification, and by reference to the diagram comprising Figure 25, and Figures 26 to 30 both inclusive.

As the post 179C, following the rotation of the arm 178C, moves into the depression 258'C, the spring 262 will move the arm 258C to the left, as viewed in Figure 26, and will operate the supply spindle clutch in a feeding direction until the post has moved beyond such depression.

As shown in Figure 27, the movement of the post 179C will be ineffective upon the arm 180C until it reaches the protuberance 209'C, at which point it will operate the supply sprocket clutch, such operation being continued indefinitely.

As shown in Figure 28, the movement of the post 179C will depress the arm 181C momentarily as it passes over the protuberance 214'C and so momentarily operate the intermittent sprocket clutch and will again depress such arm and operate such clutch as it passes over and beyond the protuberance 214C.

As shown in Figure 29, the movement of the post 179C will depress the arm 183C momentarily as it passes over the protuberance 223'C and so momentarily operate the take-up sprocket clutch and will again depress such arm, and operate such clutch indefinitely, as it passes over and beyond the protuberance 223''C.

As shown in Figure 30, the movement of the post 179C will depress the arm 182C as it passes over the protuberances 199C, 199'C, and 199''C, and so render the take-up spindle clutch operative, such clutch being rendered inoperative as the arm passes between such protuberances.

Contrary or counterclockwise movement of the arm 178C and the post 179C will have an obvious effect.

Certain of the advantages of the above described form of our invention have been stated above. Those skilled in the art will realize that other advantages arise from the provision of a method for initially positioning the film which, while entirely automatic, does not depend upon propelling the film into engagement with a toothed member. When engagement is attempted by means which include the pushing of the free end of the film against a toothed member, difficulties arise, particularly if the film is at all worn or the end is not cut carefully at right angles to the edge. No such difficulties occur, however, when the film is propelled through a smooth, clear, fully enclosed track to a winding member, wound thereupon, and thereafter, by the operation of such member in a feeding direction, positioned in operative contact with the teeth of an intervening toothed member, such member then being maintained stationary. Such method of initial positioning is certain in operation and does not damage the film. The above described form of our invention also makes possible the use of a simplified, relatively inexpensive, and automatically operable apparatus.

For use with the above form of our invention, or with other forms thereof, or otherwise, we are describing an improved form of lateral positioning and locking member.

Under certain conditions, when the film is initially positioned by the method of propelling its free end through a partially open gate, it may be desirable to substitute for the positioning and locking fingers described above, a single solid plate. The use of such plate prevents the possibility of the free end or a ragged edge of the film catching upon one of the locking fingers.

As is clearly shown in Figure 45, we mount such plate 301C upon the shaft 303C for rotation therewith. Such shaft is mounted as previously described in the fixed gate section 42C. The guide member 80C is formed with a recess into which such plate, when in the inoperative position, fits snugly. To the shaft 303C is affixed the arm 304C which by means of the link 306C is operated by the link 307C which is pivoted upon the pin 308C supported by the bracket 309C. Such link 307C is actuated by the pin 77C in the shaft 48C which works in an elongated slot in the arcuate upturned extension 310C and is operated by the spring 313C which extends from the outer end of such link to the main frame FC.

By reason of such construction, it will be evident that the movement of the gate control rod 48C to the right as viewed in Figure 45 will be effective quickly to move the link 307C past its center whereat the spring 313C will snap the link and through it and its associated parts the plate 301C into positioning and locking position. Thus, until the conclusion of the period of dwell previously described, the gate will form a completely enclosed channel or tube through which the film may be propelled. At any time, through the movement of the button 139, the feeding members may be stopped, the gate opened, and the positioning and locking plate retracted and the film removed by a manual movement lateral to the path of the film through the gate. Similarly, the film may be inserted in the gate, the guide 83C cooperating with the guide 80C, and the positioning plate 301C serving to sweep the film into the gate and into proper relation with the feeding members.

If desired, such roller 127h may be omitted, and the upper and lower loop guides operated sequentially. As is clearly shown in Figures 49, 49a, and 49b, the lower loop giude 134 may be mounted upon the pin 135 to which is attached the arm 136, as previously described, such arm, however, being directly operated by the gate control shaft 152 through a link 565, an end of which works in an elongated slot 566 of an arm 567 attached to such shaft 152, as is shown in Figure 49b.

The rods 48 and 130 are attached to the control shaft 152 by control saddles which permit further operation of such shaft 152 after the rods 48 and 130 have been fully operated.

To the right hand end of the gate rod 48, as viewed in Figure 49, there is fixed a pin 568 through an opening in which passes a rod 569 on which are mounted springs 570 and 571, such rod being supported by right angled lips 572 and 573 turned in the control plate 574, such lips also serving to confine such springs. The plate 574 is pinned to the shaft 152.

Similar mechanism is provided for the rod 130. The right hand end of such rod, as viewed in Figure 49, is turned at right angles, and through an opening therein, a rod 575 is passed, upon which are mounted springs 576 and 577, such rod being supported by right angled lips 578 and 579 turned in the control plate 580, such lips also serving to confine such springs.

By reason of such construction, it will be evident that the rotation of the rod 152 will first move the rods 48 and 130 whereby the gate is completely closed and the upper loop guide retracted and that such continued rotation will retract the lower loop guide but merely compress the springs in the control saddles which operate the rods 48 and 130.

Certain of the advantages of our invention have been stated in the above portion of this specification. Other advantages include the provision of means whereby a film or other material may be automatically positioned and handled with no requirement whatever of skill or experience on the part of the operator and with no danger of injury to the material.

We claim:

1. In a film handling apparatus which includes means for moving a film therethrough in a feeding direction and a supply spindle, driving mechanism for revolving said supply spindle in a feeding direction for propelling the free end of a film coiled upon said spindle therefrom in a feeding direction and control mechanism for starting and stopping said driving mechanism, said control mechanism including devices for stopping said driving mechanism a predetermined period after said driving mechanism has been started thereby limiting the period during which said supply spindle is revolved thereby in a feeding direction.

2. In a film handling apparatus, a supply spindle, a plurality of film moving members for advancing a film which is supported upon said supply spindle, guiding surfaces between said supply spindle and the relatively adjacent of said film moving members for directing the free end of a propelled film from said supply spindle toward said relatively adjacent film moving member, a source of power, means for applying power from said source to said supply spindle for revolving said supply spindle in a feeding direction for propelling the free end of the film toward said relatively adjacent feeding member, means for actuating said power applying means, timing mechanism for stopping the operation of said power applying means, and an operating connection between said actuating means and said timing mechanism for operating said timing mechanism whereby the operation of said spindle is stopped a predetermined period after it has been started.

3. In a film handling apparatus which includes means for alternatively moving a film therethrough in feeding and rewinding directions, a spindle, a unidirectional source of power, mechanism for connecting said spindle and said source of power for driving said spindle in a feeding direction, timing mechanism for rendering said feeding driving mechanism inoperative after a predetermined period, mechanism for connecting said spindle and said source of power for driving said spindle in a rewinding direction, and control mechanism, said control mechanism including a movable actuating member, and connections between said actuating member said driving mechanisms and said timing mechanism effective upon the movement of said actuating member to one position for rendering said rewinding driving mechanism inoperative and rendering said feeding driving mechanism operative and actuating said timing mechanism and effective upon the movement of said actuating member to another position for rendering said feeding driving mechanism inoperative and said rewinding driving mechanism operative.

4. In a film handling apparatus having means for feeding a film therethrough alternatively in opposite directions, a film supporting member, a source of power, and mechanism for applying power from said source to said member, said mechanism comprising a driven element revoluble with said member, a first driving element operated by power from said source, a second driving element operated by such power but in the reverse direction, said first and second driving elements and said driven element being movable relatively to each other, and control mechanism for moving said first and second elements and said driven element into and out of operative relation, said control mechanism including an actuating member and connections beween said actuating member and said movable element for placing said first driving element and said driven element in operative relation one to the other upon the disposition of said member in one position whereby said supporting member is revolved in one direction and for placing said second driving element and said driven element in operative relation one to the other upon the disposition of said member in another position whereby said supporting member is revolved in the other direction.

5. In a film handling apparatus, a film supporting member, a source of power, and mechanism for applying power from said source to said member, said mechanism comprising a driven element revoluble with said member, a first driving element operated by such power, a second driving element operated by such power but in the other direction, control mechanism for said elements, an actuating member for said mechanism, said actuating member being adapted for disposition in any one of three positions, and connections between said actuating member and said elements effective upon the disposition of said actuating member in one of such positions for placing said driven element and said first driving element in operative relation with each other, whereby said film supporting member is revolved in one direction, and upon the disposition of said actuating member in a second of such positions for placing said driven element and said second driving element in operative relation with each other whereby said film supporting member is revolved in the other direction, and upon the disposition of said actuating member in a third of such positions for maintaining said driven element out of operative contact with either of said driving elements whereby said film supporting member is motionless.

6. In a film handling apparatus which has means for alternatively feeding a film therethrough in a feeding direction and a rewinding direction, a supply spindle, a taking up spindle, mechanism for revolving said supply spindle in a feeding direction for propelling therefrom and toward said taking up spindle the free end of a film supported thereupon, mechanism for revolving said taking up spindle in a feeding direction for winding thereupon film from the mass supported by said supply spindle, mechanism for revolving said supply spindle in a rewinding direction for re-coiling the film thereupon from said taking up spindle, and sequential control mechanism operatively interconnecting all of said previously recited mechanisms for selectively operating each of said mechanisms.

7. In a film handling apparatus, a first carrier, a second carrier, means for starting the operation of said first carrier for propelling the free end of a film supported thereby toward said second carrier, means for starting the operation of said second carrier for winding the film thereupon, and control mechanism interlocking both of said starting means and effective for concomitantly operating both of said means.

8. In a film handling apparatus, a first carrier, a second carrier, a source of power, means for applying power from said source to said first carrier for so revolving said carrier that the free end of a film wound thereupon is propelled therefrom toward said second carrier, separate means for applying power from said source to said second carrier for the purpose of revolving said second carrier in the same direction as that in which said first carrier is revolved so that the film so propelled thereto is wound thereabout, and sequential control mechanism interlocking both of said power applying means and including devices for operating said first means for a brief pre-determined period only and said second means for an indefinite period.

9. In a film handling apparatus having means for feeding a film therethrough in a feeding direction, a supply carrier, a taking up carrier, a source of power, means for applying power from said source to said supply carrier for revolving said supply carrier in a feeding direction, separate means for applying power from said source to said taking up carrier for revolving said taking up carrier in a feeding direction, and an operative interconnection between said separate power applying means for rendering said means for applying power to said supply carrier inoperative a predetermined period after said means for rendering said means for applying power to said taking up carrier has been rendered operative.

10. In a film handling apparatus, two carriers, guiding means operable for forming an unimpeded channel through which the free end of a film supported by one of said carriers may be propelled to the other of said carriers, said guiding means including a guiding member which is movable in relation to said channel, means for moving said guiding member in relation to such channel, means for propelling such free end through such channel, and control mechanism operatively interconnecting said moving means and said propelling means for concomitantly operating both of said means.

11. In a film handling apparatus, two carriers, guiding means operable for forming an unimpeded channel through which the free end of a film supported by one of said carriers may be propelled to the other of said carriers, said guiding means including a guiding member which is movable in relation to said channel, means for moving said guiding member in relation to said channel, means for propelling said free end through said channel, and control mechanism operatively interconnecting said propelling means and said moving means and including devices for selectively operating said propelling means and said moving means and timing means for determining the period which elapses between said operations.

12. In a film handling apparatus, two carriers, guiding means operable for forming an unimpeded channel through which the free end of a film supported by one of said carriers may be propelled to the other of said carriers, said guiding means including a movable member, means for moving said member to said guiding position for forming said channel, means for propelling the film through said channel, means for moving said guiding member away from said guiding position for destroying said channel, and control mechanism operatively interconnecting all of said means and including devices for operating each of said means in sequential relation to the operation of the other thereof.

13. In a film handling apparatus, two carriers, means for driving the first of said carriers for propelling the free end of a film coiled thereupon toward said second carrier, a source of power, means for controlling the application of power from said source to said first carrier, guiding means associated with said second carrier for receiving said free end of the film as propelled toward said second carrier and establishing a path for directing it to and about the core thereof, said guiding means including at least one film contacting member movable in relation to said path, means for moving said film contacting member, and control mechanism operatively interconnecting said moving means and said power controlling means for concomitantly operating both of said means.

14. In a film handling apparatus, a revoluble spindle adapted for the removable mounting of a carrier thereupon, means for establishing a path for guiding the free end of a film relatively to the core of a carrier placed upon said spindle, said guiding means including at least one film contacting member movable relatively to said path, means for moving said film contacting member, a source of power, means for applying power from said source to said spindle for revolving said spindle, and control mechanism operatively interconnecting said moving means and said power applying means for concomitantly operating both of said means.

15. In a film handling apparatus, a revoluble spindle adapted for the removable mounting of a carrier thereupon, means for establishing a path for guiding free end of a film relatively to the core of a carrier placed upon said spindle, said guiding means including at least one film contacting member movable relatively to said path, means for moving said film contacting member, a source of power, means for applying power from said source to said spindle for revolving said spindle, and sequential control mechanism operatively interconnecting said moving means and said power applying means and including devices for operating one of said means in succesive relation to the operation of the other thereof.

16. In a film handling apparatus, a revoluble spindle adapted for the removable mounting of a carrier thereupon, guiding means operable to form an unimpeded channel through which the free end of a film may be guided in relation to said carrier, said guiding means including a guiding member which is movable in relation to said channel, means for moving said guiding member, control means for alternatively revolving said spindle in a feeding and in a rewinding direction, and a connection between said control means and said moving means for moving said member to guiding position prior to the operation of said control means for revolving said spindle in a feeding direction and for moving said member away from guiding position prior to the operation of said control means for revolving said spindle in a rewinding direction.

17. In a film handling apparatus, a revoluble spindle adapted for the removable mounting of a carrier thereupon, means for establishing a path for guiding the free end of a film relatively to the core of a carrier placed upon said spindle, said guiding means including at least one film contacting member movable between a position wherein it assists in the establishment of said path and another position wherein it is out of guiding relation to the film, means for moving said film contacting member between said positions, a source of power, means for applying power from said source to said spindle for revolving said spindle, and control mechanism operatively interconnecting said moving means and said power applying means and including devices for necessarily maintaining said spindle inoperative until said film contacting member has been moved into path establishing position.

18. In a film handling apparatus, a revoluble spindle adapted for the removable mounting of a carrier thereupon, means for establishing a path for guiding the free end of a film relatively to the core of a carrier placed upon said spindle, said guiding means including at least one film contacting member movable between a position wherein it assists in the establishment of said path and another position wherein it is out of guiding relation to the film, means for moving said film contacting member between said positions, a source of power, means for applying power from said source to said spindle for revolving said spindle, and control mechanism operatively interconnecting said moving means and said power applying means and including devices for moving said film contacting member to path establishing position and operating said power applying means and for moving said film contacting member from path establishing position without affecting said power applying means.

19. In a film handling apparatus, a revoluble spindle adapted for the removable mounting of a carrier thereupon, means for establishing a path for guiding the free end of a film relatively to a carrier placed upon said spindle, said guiding means including at least one film contacting member movable relatively to said path, means for moving said film contacting member, means for applying power from said source to said spindle for revolving said spindle, means for actuating said power applying means, an operating connection between said actuating means and said means for moving said film contacting member for operating said moving means by said actuating means, and timing means governing said operating connection for interposing a predetermined interval between the operation of said power applying means and the operation of said moving means.

20. In a film handling apparatus, a revoluble spindle adapted for the removable mounting of a carrier thereupon, means for establishing a path for guiding the free end of a film relatively to the core of a carrier placed upon said spindle, said guiding means including at least one film contacting member movable relatively to said path, means for moving said film contacting member, a source of power, a clutch for applying power from said source to said spindle for revolving said spindle, and control mechanism operatively interconnecting said moving means and said clutch for concomitantly operating said means and said clutch.

21. In a film handling apparatus, a revoluble spindle adapted for the removable mounting of a carrier thereupon, means for establishing a path for guiding the free end of a film relatively to the core of a carrier placed upon said spindle, said guiding means including at least one film contacting member movable between a position wherein it assists in the establishment of said path and another position wherein it is out of guiding relation to the film, means for moving said film contacting member between said positions, a motor for driving said spindle, a switch for said motor, and control mechanism operatively interconnecting said switch and said moving means for concomitantly operating said switch and actuating said moving means.

22. In a film handling apparatus, a revoluble spindle adapted for the removable mounting of a carrier thereupon, means for establishing a path for guiding the free end of a film relatively to the core of a carrier placed upon said spindle, said guiding means including at least one film contacting member movable between a position wherein it assists in the establishment of said path and another position wherein it is out of guiding relation to the film, means for moving said film contacting member between said positions, a motor for driving said spindle, a switch for said motor, and control mechanism operatively interconnecting said switch and said moving means and including devices for holding said switch in circuit-breaking position until said film contacting member has been moved to such path establishing position.

23. In a film handling apparatus, a revoluble spindle, a first source of power for revolving said spindle, means for operatively connecting said spindle and said first source of power, an operable film guiding member movable to a position wherein it cooperates with said spindle by guiding a film relatively thereto, mechanism for moving said member in relation to said position, a second source of power, means for applying said second source of power to said moving mechanism, and control mechanism operatively interconnecting both of said power applying means for concomitantly operating said means.

24. In a film handling apparatus, a revoluble spindle, a first source of power for revolving said spindle, means for operatively connecting said spindle and said first source of power, an operable film guiding member movable to a position wherein it cooperates with said spindle by guiding a film relatively thereto, mechanism for moving said member in relation to said position, a second source of power, means for applying said second source of power to said moving mechanism, and sequential control mechanism operatively interconnecting both of said power applying means, said control means including devices for first operating one of said power applying means and thereafter operating the other of said power applying means.

25. In a film handling apparatus, a revoluble spindle upon which a film winding core may be mounted, complementary members for establishing a path through which a film is guided relatively to said core, a spring for separating said members, a latch for said spring, means for driving said spindle, and control mechanism operatively interconnecting said latch and said driving means for actuating said driving means concomitantly with the withdrawal of said latch from holding relation to the spring.

26. In a film handling apparatus, a spindle upon which a film winding core may be mounted, complementary members for establishing a path through which a film is guided relatively to said core, a spring for separating said members, a latch for said spring, means for driving said spindle, and control mechanism interlocking said latch and said driving means and including devices for actuating said driving means and releasing said latch in successive relation.

27. In a film handling apparatus, a revoluble spindle adapted for the removable mounting of a carrier thereupon, means for establishing a path for guiding the free end of a film relatively to the core of a carrier placed upon said spindle, said guiding means including at least one film contacting member movable relatively to said path, a spring for moving said film contacting member, means placing said spring under tension, a source of power for said spindle, means for applying power from said source to said spindle, and control mechanism operatively interconnecting said power-applying means and said tensioning means for concomitantly operating both of said means.

28. In a film handling apparatus, a revoluble spindle adapted for the removable mounting of a carrier thereupon, means for establishing a path for guiding the free end of a film relatively to the core of a carrier placed upon said spindle, said guiding means including at least one film contacting member movable relatively to said path, a spring for moving said film contacting member away from said path, means placing said spring under tension, a latch for holding said spring under tension, a source of power, means for applying power from said source to said spindle, a handle, connections between said handle and said power applying means and said spring tensioning means for rendering said power applying means inoperative to revolve said spindle and for tensioning said spring under the holding influence of said latch upon one movement of said handle, and connections between said handle and said power applying means and said latch for rendering said power applying means operative to revolve said spindle and releasing said latch upon another movement of said handle.

29. In a film handling apparatus, a spindle adapted for the removable mounting of a carrier thereupon, a feeding member for moving a film in relation to a carrier upon said spindle, guiding means for establishing a path for directing the leading end of a film between said feeding member and said spindle, said guiding means including at least one film contacting member which is movable in relation to said path, means for moving said film contacting member in relation to said path, a source of power, means for applying power from said source to said feeding member, and control mechanism operatively interconnecting said power applying means and said moving means for concomitantly operating both of said means.

30. In a film handling apparatus, a spindle adapted for the removable mounting of a carrier thereupon, a feeding member for moving a film in relation to a carrier upon said spindle, guiding means for establishing a path for directing the leading end of a film between said feeding member and said spindle, said guiding means including at least one film contacting member which is movable in relation to said path, means for moving said film contacting member in relation to said path, a source of power, means for applying power from said source to said feeding member, and control mechanism operatively interconnecting said power applying means and said moving means and including devices for concomitantly operating said moving means for moving said film contacting member into path establishing position and operating said power applying means and devices for operating said moving means for moving said film contacting member away from path establishing position without affecting said power applying means.

31. In a film handling apparatus, a spindle adapted for the removable mounting of a carrier thereupon, a feeding member for moving a film in relation to a carrier upon said spindle, guiding means for establishing a path for directing the leading end of a film between said feeding member and said spindle, said guiding means including at least one film contacting member which is movable in relation to said path, means for moving said film contacting member in relation to said path, a source of power, means for applying power from said source to said feeding member, and control mechanism operatively interconnecting said power applying means and said moving means for preventing the operation of said power applying means until said film contacting member has been moved into such path-establishing position.

32. In a film handling apparatus, a supply spindle, a supply feeding member for drawing film from said supply spindle, a taking up spindle, a taking up feeding member for advancing the film toward said taking up spindle so that it may be coiled thereupon, a source of power, means for applying power from said source to said supply spindle for revolving said supply spindle in a feeding direction so that the film supported thereby is advanced toward said supply feeding member for the purpose of assisting in the film threading operation, timing means for rendering said previously mentioned power applying means inoperative after a brief predetermined period, a guiding structure for establishing a path of travel for the film between said supply spindle and said supply feeding member, said structure including a film contacting member movable between a position wherein it establishes a portion of such path and a position wherein it is without guiding relation to such path, means for moving said film contacting member between said positions, a guiding structure for establishing a path of travel for the film between said taking up feeding member and said taking up spindle, said structure including a film contacting member movable between a position wherein it establishes a portion of such path and a position wherein it is without guiding relation to the film, means for moving said last previously mentioned film contacting member between said positions, a structure for guiding the film between said previously recited guiding structures, means for applying power from said source to said supply feeding member, said taking up feeding member, and said taking up spindle for the purpose of carrying out the regular feeding operation, and control mechanism operatively interconnecting all of said means for concomitantly operating all of said means.

33. In a film handling apparatus, a supply spindle, a supply feeding member for drawing film from said supply spindle, a taking up spindle, a taking up feeding member for advancing the film toward said taking up spindle so that it may be coiled thereupon, a source of power, means for applying power from said source to said supply spindle for revolving said supply spindle in a feeding direction so that the film supported thereby may be advanced toward said supply feeding member for the purpose of assisting in the film threading operation, timing means for rendering said previously mentioned power applying means inoperative after a brief predetermined period, a guiding structure for establishing a path of travel for the film between said supply spindle and said supply feeding member, said structure including a film contacting member movable between a position wherein it establishes a portion of such path and a position wherein it is without guiding relation to such path, means for moving said film contacting member between said positions, a guiding structure for establishing a path of travel for the film between said taking up feeding member and said taking up spindle, said structure including a film contacting member movable between a position wherein it establishes a portion of such path and a position wherein it is without guiding relation to the film, means for moving said last previously mentioned film contacting member between said positions, a structure for guiding the film between said previously recited structure, means for applying said power from said source to said supply feeding member, said taking up feeding member, and said taking up spindle for the purpose of carrying out the regular feeding operation, and sequential control mechanism operatively interconnecting all of said means and including devices for selectively operating each of said means.

34. In a film handling apparatus, a supply spindle, a supply feeding member for drawing film from said supply spindle, a taking up spindle, a taking up feeding member for advancing the film toward said taking up spindle so that it may be coiled thereupon, a source of power, means for applying power from said source to said supply spindle for revolving said supply spindle in a feeding direction so that the film supported thereby may be advanced toward said supply feeding member for the purpose of assisting in the film threading operation, timing means for rendering said previously mentioned power applying means inoperative after a brief predetermined period, a guiding structure for establishing a path of travel for the film between said supply spindle and said supply feeding member, said structure including a film contacting member movable between a position wherein it establishes a portion of such path and a position wherein it is without guiding relation to such path, means for moving said film contacting member between said positions, a guiding structure for establishing a path of travel for the film between said taking up feeding member and said taking up spindle, said structure including a film contacting member movable between a position wherein it establishes a portion of such path and a position wherein it is without guiding relation to the film, a structure for guiding the film between said previously recited guiding structures, means for moving said last previously mentioned film contacting member between said positions, and means for applying said source of power to said supply feeding member, said taking up feeding member, and said taking up spindle for the purpose of carrying out the regular feeding operation.

35. In a film handling apparatus, a supply spindle, a supply feeding member for drawing film from said supply spindle, a taking up spindle, a taking up feeding member for advancing the film toward said taking up spindle so that it may be coiled thereupon, a guiding structure for establishing a path of travel for the film between said supply spindle and said supply feeding member, said structure including a film contacting member movable between a position wherein it establishes a portion of such path and a position wherein it is without guiding relation to such path, means for moving said film contacting member between said positions, a guiding structure for establishing a path of travel for the film between said taking up feeding member and said taking up spindle, said structure including a film contacting member movable between a position wherein it establishes a portion of such path and a position wherein it is without guiding relation to the film, means for moving said last previously mentioned film contacting member between said positions, a structure for guiding the film between said previously recited guiding structures, a source of power, means for applying power from said source to said supply spindle, said supply feeding member, said taking up feeding member, and said taking up spindle for the purpose of revolving all of said member in a feeding direction, and control mechanism operatively interconnecting all of said means for concomitantly operating all of said means.

36. In a film handling apparatus, a spindle adapted for the removable mounting of a carrier thereupon, a feeding member for moving a film in relation to a carrier upon said spindle, guiding means for establishing a path for directing a film between said feeding member and said spindle, said guiding means including at least one film contacting member which is movable in relation to said path, a spring for moving said film contacting member, a latch for said spring, a source of power for driving said feeding member, means for rendering said source of power effective to drive said feeding member, and control mechanism operatively interconnecting said means for rendering said source of power effective to drive said feeding member and said latch for concomitantly operating said means and withdrawing said latch from holding relation to said spring.

37. In a film handling apparatus, a spindle adapted for the removable mounting of a carrier thereupon, a feeding member for moving a film in relation to a carrier upon said spindle, guiding means for establishing a path for directing a film between said feeding member and said spindle, said guiding means including at least one film contacting member which is movable in relation to said path, a spring for moving said film contacting member, means for placing said spring under tension, a source of power for driving said feeding member, means for controlling the application of power from said source to said feeding member, and control mechanism operatively interconnecting said power controlling means and said means for tensioning said spring for concomitantly operating both of said means.

38. In a film handling apparatus, a spindle adapted for the removable mounting of a carrier thereupon, a feeding member for moving a film in relation to a carrier upon said spindle, guiding means for establishing a path for directing a film between said feeding member and said spindle, said guiding means including at least one film contacting member which is movable in relation to said path, a spring for moving said film contacting member, means for placing said spring under tension, means for controlling the application of power from said source to said feeding member, and mechanism operatively interconnecting said power controlling means and said means for moving said film contacting member and including devices for concomitantly operating said power controlling means to render said source of power inoperative upon said feeding member and for operating said spring tensioning means to place said spring under tension under the holding influence of said latch.

39. In a film handling apparatus, a spindle adapted for the removable mounting of a carrier thereupon, a feeding member for moving a film in relation to a carrier upon said spindle, guiding means for establishing a path for directing a film between said feeding member and said spindle, said guiding means including at least one film contacting member which is movable in relation to said path, a spring for moving said film contacting member away from said path, means for placing said spring under tension, a latch for holding said spring under tension, a source of power, means for applying power from said source to said feeding member, a handle, connections between said handle and said power applying means and said spring tensioning means for rendering said power applying means inoperative to revolve said feeding member and for placing said spring under tension under the holding influence of said latch upon one movement of said handle, and connections between said handle and said power applying means and said latch for rendering said power applying means operative upon said feeding member and releasing said latch upon another movement of said spindle.

WARREN DUNHAM FOSTER.
FREDERICK DAVENPORT SWEET.